United States Patent
Kitamura

(10) Patent No.: US 7,764,845 B2
(45) Date of Patent: Jul. 27, 2010

(54) SIGNAL PROCESSING METHOD AND DEVICE AND VIDEO SYSTEM

(75) Inventor: Shinji Kitamura, Kyoto (JP)

(73) Assignee: Panasonic Corporation, Osaka (JP)

( * ) Notice: Subject to any disclaimer, the term of this patent is extended or adjusted under 35 U.S.C. 154(b) by 1352 days.

(21) Appl. No.: 11/223,938

(22) Filed: Sep. 13, 2005

(65) Prior Publication Data

US 2006/0067407 A1 Mar. 30, 2006

(30) Foreign Application Priority Data

Sep. 24, 2004 (JP) .............................. 2004-277778

(51) Int. Cl.
*G06K 9/36* (2006.01)
*H04N 11/04* (2006.01)
*H04N 7/12* (2006.01)

(52) U.S. Cl. .................................. 382/250; 375/240.18

(58) Field of Classification Search ................. 382/164, 382/173, 224, 225, 232, 239, 248, 250–251, 382/284, 303, 305, 312; 375/240.01, 240.03, 375/240.18, 240.2, E7.09, E7.026, E7.046, 375/E7.14, E7.142, E7.148, E7.211; 348/415.1; 358/479

See application file for complete search history.

(56) References Cited

U.S. PATENT DOCUMENTS

| | | | | |
|---|---|---|---|---|
| 4,972,260 A | * | 11/1990 | Fujikawa et al. | ........ 375/240.03 |
| 5,089,888 A | * | 2/1992 | Zdepski et al. | ......... 375/240.03 |
| 5,121,216 A | * | 6/1992 | Chen et al. | .................... 382/239 |
| 5,144,428 A | * | 9/1992 | Okuda et al. | ............. 375/240.2 |
| 5,173,773 A | * | 12/1992 | Ueda et al. | ............. 375/240.18 |
| 5,430,556 A | * | 7/1995 | Ito | .............................. 382/251 |
| 5,485,533 A | * | 1/1996 | Hatano et al. | ................ 382/236 |
| 5,543,928 A | * | 8/1996 | Takakura | ..................... 386/116 |
| 5,576,958 A | | 11/1996 | Kawakatsu et al. | |
| 6,212,236 B1 | | 4/2001 | Nishida et al. | |
| 6,292,585 B1 | * | 9/2001 | Yamaguchi et al. | ......... 382/232 |
| 7,006,714 B2 | * | 2/2006 | Kasutani | ..................... 382/305 |
| 2006/0067407 A1 | * | 3/2006 | Kitamura | ............... 375/240.18 |

FOREIGN PATENT DOCUMENTS

| | | |
|---|---|---|
| JP | 07-262175 | 10/1995 |
| JP | 10-327412 A | 12/1998 |

OTHER PUBLICATIONS

Japanese Office Action, with English translation, issued in Japanese Patent Application No. 2004-277778, mailed Jul. 7, 2009.

* cited by examiner

*Primary Examiner*—Amir Alavi
(74) *Attorney, Agent, or Firm*—McDermott Will & Emery LLP

(57) ABSTRACT

In a signal processing device for performing inverse orthogonal transform for a combination of orthogonal transform coefficients obtained by orthogonal-transforming a signal, a pixel signal value for a combination of orthogonal transform coefficients high in appearance is stored in advance in a pixel signal table together with an index assigned thereto. If a pixel signal value corresponding to a combination of orthogonal transform coefficients received via an input terminal is stored in the pixel signal table, an index generation circuit outputs a flag to a selection circuit and also outputs an index to the pixel signal table. The pixel signal table outputs the pixel signal value corresponding to the received index, and an image signal generation circuit generates a combination of pixel signal values as a restored signal. A selection circuit selects the output of the pixel signal generation circuit.

26 Claims, 12 Drawing Sheets

FIG. 3A FIG. 3B FIG. 3C FIG. 3D
FIG. 3E FIG. 3F FIG. 3G FIG. 3H
FIG. 3I FIG. 3J FIG. 3K FIG. 3L

| Group | FLG | Index |
|---|---|---|
| 0 | 1 | 0 |
| 1 | 1 | 1 |
| 2 | 1 | 2 |

| INDEX | PIXEL SIGNAL VALUE |
|---|---|
| 0 | 0 |
| 1 | 1 |
| 2 | 2 |

CBP=110101

SIGNAL PROCESSING METHOD AND DEVICE AND VIDEO SYSTEM

CROSS-REFERENCE TO RELATED APPLICATIONS

This application claims priority under 35 U.S.C. §119(a) on Patent Application No. 2004-277778 filed in Japan on Sep. 24, 2004, the entire contents of which are hereby incorporated by reference.

BACKGROUND OF THE INVENTION

The present invention relates to a signal processing method and device, and more particularly, to a method and device for performing inverse orthogonal transform in block-unit for an image signal for which high-speed processing is required.

In recent years, high-efficiency coding technologies for moving images, such as MPEG, have increasingly been studied and found applications in various fields such as computers, communications, AV equipment and broadcasting.

In such coding technologies, an image compression technology is employed in which an image is divided into a plurality of small blocks so that coding be made sequentially in units of blocks. That is, intra-frame prediction coding (hereinafter, called intra-coding) in which reduction (compression) in information amount is intended by attempting to reduce intra-frame spatial redundancy and inter-frame prediction coding (hereinafter, called inter-coding) in which reduction (compression) in information amount is intended by attempting to reduce inter-frame temporal redundancy are employed, to achieve high-efficiency coding.

The above coding technologies will be briefly described with reference to FIG. 15. FIG. 15 shows a general MPEG coding device. Referring to FIG. 15, an image signal in blocks is input into an orthogonal transform circuit 90. The image signal as used herein refers to an image signal of a frame to be coded in the intra-coding and to a differential signal between a frame to be coded and a prediction (reference) frame in the inter-coding. The image signal in blocks input into the orthogonal transform circuit 90 is then subjected to discrete cosine transform (DCT, herein called orthogonal transform) to produce orthogonal transform coefficients.

Subsequently, to enhance the coding efficiency, a quantization circuit 91 quantizes the orthogonal transform coefficients, that is, removes high-frequency components of the orthogonal transform coefficients, to obtain quantized coefficients. The quantized coefficients are then input into a coding circuit 92 where run-length coding and entropy coding are performed to produce a bitstream.

Meanwhile, to produce a reference image required for inter-coding of the next frame, local decoding of the current frame is performed. Specifically, after completion of the coding by the coding circuit 92, the quantized coefficients from the quantization circuit 91 are input into an inverse quantization circuit 93 to be subjected to inverse quantization, and then input into an inverse orthogonal transform circuit 94 to be subjected to inverse orthogonal transform, to thereby restore an image signal.

Next, a decoding technology will be briefly described with reference to FIG. 16. A coded bitstream from the coding circuit 92 and the like is input into a decoding circuit 94 and subjected to entropy decoding and run-length decoding to produce quantized coefficients. The quantized coefficients are then input into an inverse quantization circuit 95 and subjected to inverse quantization to obtain orthogonal transform coefficients. The orthogonal transform coefficients are then subjected to inverse orthogonal transform in an inverse orthogonal transform circuit 96, to thereby restore an image signal.

In the MPEG coding and decoding described above, orthogonal transform and inverse orthogonal transform require execution of multiply and accumulate operation including a decimal fraction, as described in ISO/IEC 1449 6-2. Annex A, for example. This execution involves an enormous amount of processing, and thus a large problem arises in achievement of speedup in coding and decoding.

With the recent progress in enhancement in quality of images, as represented by the start of digital broadcasting, the advent of high-definition cameras and the like, speedup in coding and decoding has been increasingly demanded in the coding technologies such as MPEG. It has however been difficult to respond to this demand due to the problem described above.

To overcome the above problem, a technology for speeding up decoding as disclosed in Japanese Laid-Open Patent Publication No. 10-327412, for example, is conventionally known. The technology disclosed in this publication will be briefly described.

FIG. 17 shows an example of a typical decoding device disclosed in the aforementioned publication. This decoding device is largely different from the preceding decoding device in that the former includes a first constant generation circuit 97 for generating a constant zero and a first selection circuit 98 for receiving the output (constant zero) of the first constant generation circuit 97 and orthogonal transform coefficients from the inverse orthogonal transform circuit 96 to select either one of the two inputs, in addition to the decoding circuit 94, the inverse quantization circuit 95 and the inverse orthogonal transform circuit 96 described above.

The decoding method in the decoding device of FIG. 17 will be described. A bitstream is input into the decoding circuit 94 to be subjected to decoding. In MPEG, coding has been made in the unit called macro-block composed of six blocks (8×8 pixels) as shown in FIG. 18, and thus decoding will also be made in this unit. By this macro-block decoding, obtained are not only quantized coefficients but also parameters called coded block patterns (CBP). The CBP is a flag indicating whether or not a nonzero value exists as a quantized coefficient in each of the blocks constituting a macro-block, with each flag corresponding to each of the six blocks of the macro-block.

FIG. 19 shows a specific example of the parameters CBP obtained from the decoding circuit 94. Referring to FIG. 19, a macro-block is composed of a total of six blocks, that is, four luminance component blocks Y0, Y1, Y2 and Y3 and two color-difference component blocks Cb and Cr. Assume that CBP=110101 was obtained as a result of the decoding. This indicates that at least one nonzero quantized coefficient exists in the four blocks Y0, Y1, Y3 and Cr (hatched blocks in FIG. 19). This also indicates that in the remaining two blocks Y2 and Cb of which CBP=0, all quantized coefficients included in these blocks are 0 (zero). In this manner, whether or not all quantized coefficients in each block are 0 (zero) can be determined with the parameters CBP obtained from the results of the decoding by the decoding circuit 94.

In the example described above, in each of the blocks Y0, Y1, Y3 and Cr of which CBP=1, at least one nonzero quantized coefficient is included. Therefore, after the decoding, such a coefficient is subjected to inverse quantization and inverse orthogonal transform. The first selection circuit 98 selects the output of the inverse orthogonal transform circuit 96 based on the CBP of 1, to thereby restore an image signal.

In each of the blocks Y2 and Cb of which CBP=0, all quantized coefficients are 0 (zero). Therefore, no further decoding is necessary. In place of performing the inverse quantization and the inverse orthogonal transform, therefore, the first constant generation circuit 97 generates a restored image signal (all zero) that should be obtained when all quantized coefficients are 0 (zero). The first selection circuit 98 selects the restored image signal (all zero) from the first constant generation circuit 97 based on the CBP of 0.

As described above, in the aforementioned publication, inverse quantization and inverse orthogonal transform involving a large amount of processing are executed only when necessary based on the value of the parameter CBP, to thereby enable speedup in decoding.

Thus, by use of the decoding device described in the aforementioned publication, inverse orthogonal transform involving a large amount of processing may be executed only in the minimum required cases, and thus speedup in decoding can be achieved.

However, the decoding device described in the aforementioned publication has the following drawback. In the cases that an image including many noises has been coded, that the information compression rate in coding is low, and that the coding has been made with a coding device low in motion detection accuracy, among others, an image signal in the inter-frame prediction coding (a differential signal between a prediction frame and the current frame) becomes large, and this reduces the probability that all quantized coefficients in a block will be 0 (zero). In such cases, in the decoding device disclosed in the aforementioned publication, the CBP seldom becomes 0 in decoding of a coded bitstream, and thus the opportunity of selecting the restored image signal (all zero) from the first constant generation circuit 97 little arises. As a result, achievement of speedup in decoding will be difficult.

SUMMARY OF THE INVENTION

An object of the present invention is providing a signal processing method and a signal processing device in which the number of times of execution of inverse orthogonal transform involving a large amount of processing is minimized even when all quantized coefficients in a block are not 0 (CBP=1), to attain high speed and low power consumption.

The signal processing method of the present invention is a signal processing method for performing inverse orthogonal transform for a combination of orthogonal transform coefficients obtained by orthogonal-transforming a signal, the method including the steps of: storing in advance a signal value obtained by performing inverse orthogonal transform for at least one predetermined combination of orthogonal transform coefficients (storing step); receiving combinations of orthogonal transform coefficients sequentially and determining whether or not each of the received combinations of orthogonal transform coefficients corresponds with the predetermined combination of orthogonal transform coefficients for which the signal value is stored in advance (determining step); and performing first inverse orthogonal transform in which a restored signal is output based on the signal value stored in advance if the received combination of orthogonal transform coefficients corresponds with the predetermined combination of orthogonal transform coefficients as a result of the determination, and performing second inverse orthogonal transform in which the received combination of orthogonal transform coefficients is subjected to inverse orthogonal transform by computation if the received combination of orthogonal transform coefficients does not correspond with the predetermined combination of orthogonal transform coefficients (processing step).

In an embodiment of the invention, in the signal processing method described above, the predetermined combination of orthogonal transform coefficients corresponding to the signal value stored in advance in the storing step is a combination of orthogonal transform coefficients high in appearance.

In an embodiment of the invention, in the storing step of the signal processing method described above, a plurality of signal values are stored in advance, each of the plurality of signal values is a signal value corresponding to one group consisting of a plurality of combinations of orthogonal transform coefficients that will give the same signal value when being subjected to inverse orthogonal transform, and indexes corresponding to the plurality of signal values are assigned to the respective signal values.

In an embodiment of the invention, in the signal processing method described above, the determining step includes the steps of: grouping received combinations of orthogonal transform coefficients (grouping step); and determining whether or not a group to which a received combination of orthogonal transform coefficients belongs is a group corresponding to any signal value stored in advance in the storing step, and if the received combination belongs to the corresponding group, generating a flag as well as generating an index for specifying the signal value for the corresponding group (index generating step), and in the processing step, the signal value corresponding to the index is read to output a restored signal if the flag is generated, and the received combination of orthogonal transform coefficients is subjected to inverse orthogonal transform by computation to output a restored signal if no flag is generated.

In an embodiment of the invention, in the signal processing method described above, the signal value stored in advance in the storing step is not fixed but variably changeable.

The signal processing device of the present invention is a signal processing device for performing inverse orthogonal transform for a combination of orthogonal transform coefficients obtained by orthogonal-transforming a signal, the device including: a storage section for storing in advance a signal value obtained by performing inverse orthogonal transform for at least one predetermined combination of orthogonal transform coefficients; a determination section for receiving combinations of orthogonal transform coefficients sequentially and determining whether or not each of the received combinations of orthogonal transform coefficients corresponds with the predetermined combination of orthogonal transform coefficients for which the signal value is stored in advance; and a processing section for performing first inverse orthogonal transform in which a restored signal is output based on the signal value stored in advance if the received combination of orthogonal transform coefficients corresponds with the predetermined combination of orthogonal transform coefficients as a result of the determination by the determination section, and performing second inverse orthogonal transform in which the received combination of orthogonal transform coefficients is subjected to inverse orthogonal transform by computation if the received combination of orthogonal transform coefficients does not correspond with the predetermined combination of orthogonal transform coefficients.

Alternatively, the signal processing device of the present invention is a signal processing device for performing inverse orthogonal transform for a predetermined combination of orthogonal transform coefficients obtained by orthogonal-transforming a signal, the device including: a storage section for storing in advance a signal value obtained by performing inverse orthogonal transform for at least one predetermined combination of orthogonal transform coefficients; an index generation section for grouping a plurality of received combinations of orthogonal transform coefficients, determining whether or not a signal value corresponding to each group is stored in advance in the storage section, and if the signal value is stored in the storage section, generating a flag as well as supplying an index for specifying the signal value for the corresponding group to the storage section to enable output of the signal value for the corresponding group from the storage section; a signal output section for receiving the signal value output from the storage section and sequentially outputting a plurality of signal values constituting a restored signal based on the signal value; an inverse orthogonal transform section for performing inverse orthogonal transform for the received combination of the orthogonal transform coefficients by computation; and a selection section for selecting the signal values from the signal output section if the index generation section generates a flag, and selecting the output from the inverse orthogonal transform section if no flag is generated, wherein inverse orthogonal transform for a received combination of orthogonal transform coefficients is switched between first inverse orthogonal transform of outputting a restored signal based on the signal value stored in advance and second inverse orthogonal transform performed by computation.

In an embodiment of the invention, in the signal processing device described above, the storage section is constructed of a storage permitting rewrite of a signal value.

In an embodiment of the invention, in the signal processing device described above, the storage section is constructed of a region of a storage included in a different device, the device further includes a request generation section for generating a transfer request for a signal value and outputting the request to a control section for controlling write/read in/from the storage included in the different device when the index generation section generates a flag, the index generation section outputs the index to the storage included in the different device, and once a transfer acknowledgment for the signal value is obtained from the control section, the signal value is read from the storage included in the different device.

In an embodiment of the invention, in the signal processing device described above, the control section outputs a status flag indicating the status of the different device to the request generation section, and the request generation section determines whether or not to issue a transfer request for a signal value to the control section based on the status flag from the control section.

In an embodiment of the invention, in the signal processing device described above, the storage section is used as a dedicated storage section, and the device further includes a common storage section constructed of a region of a storage included in a different device separately from the dedicated storage section, the index generation section determines in which storage section, the dedicated storage section or the common storage section, a signal value corresponding to a group to which the received combination of orthogonal transform coefficients belongs is stored, and outputs the index specifying the signal value for the corresponding group to the dedicated storage section or the common storage section when the signal value is stored in the dedicated storage section or the common storage section, to enable output of the signal value for the corresponding group from the dedicated storage section or the common storage section.

In an embodiment of the invention, in the signal processing device described above, the signal is an image signal the storage section is provided for each color component of the image signal, and the switching between the first inverse orthogonal transform and the second inverse orthogonal transform is performed for each color component.

In an embodiment of the invention, in the signal processing device described above, the signal is an image signal to be coded, the storage section is provided for each coding type for the image signal, and the switching between the first inverse orthogonal transform and the second inverse orthogonal transform is performed for each coding type for the image signal.

In an embodiment of the invention, in the signal processing device described above, the signal is an image signal to be coded and decoded, the storage section is provided for each mode, coding or decoding, for the image signal, and the switching between the first inverse orthogonal transform and the second inverse orthogonal transform is performed for each mode, coding or decoding, for the image signal.

In an embodiment of the invention, the signal processing device described above further includes a setting section for setting whether to perform the first inverse orthogonal transform of outputting a restored signal based on a signal value stored in advance in the storage section, or to perform, not the first inverse orthogonal transform, but the second inverse orthogonal transform of performing inverse orthogonal transform for a received combination of orthogonal transform coefficients by computation although execution of the first inverse orthogonal transform is possible, by switching from outside.

In an embodiment of the invention, the signal processing device described above further includes a clock signal control section for supplying a clock signal to the storage section and the signal output section while stopping supply of the clock signal to the inverse orthogonal transform section if the index generation section generates a flag, and supplying the clock signal to the inverse orthogonal transform section while stopping the supply of the clock signal to the storage section and the signal output section if the index generation section generates no flag.

In an embodiment of the invention, the signal processing device described above further includes: a hit count management section for receiving an index from the index generation section and counting the number of times of output of each index; and an appearance count management section for storing in advance a predetermined combination of orthogonal transform coefficients other than any combination of orthogonal transform coefficients corresponding to any signal value stored in the storage section and counting the number of times of appearance of the predetermined combination of orthogonal transform coefficients.

In an embodiment of the invention, the signal processing device described above further includes: a comparison section for comparing the output count of each index in the hit count management section with the appearance count of a predetermined combination of orthogonal transform coefficients stored in advance in the appearance count management section; and an updating section for updating the storage section, in response to the result of the comparison by the comparison section, by storing in the storage section the predetermined combination of orthogonal transform coefficients stored in advance in the appearance count management section, in place of a combination of orthogonal transform coefficients corresponding to any index in the hit count management section, if the appearance count of the predetermined combination of orthogonal transform coefficients stored in the appearance count management section is larger than the output count of the index.

In an embodiment of the invention, in the signal processing device described above, the signal is an image signal, the storage section is provided in common for a plurality of color components of the image signal, and higher priority is given to one predetermined color component among the color components of the image signal in the updating of the storage section by the updating section.

In an embodiment of the invention, in the signal processing device described above, the signal is an image signal to be coded, the storage section is provided in common for all coding types for the image signal, and higher priority is given to one predetermined coding type than to any other coding type in the updating of the storage section by the updating section.

In an embodiment of the invention, in the signal processing device described above, the signal is an image signal to be coded and decoded, the storage section is provided in common for both modes, coding and decoding, for the image signal, and higher priority is given to one mode than to the other mode in the updating of the storage section by the updating section.

In an embodiment of the invention, in the signal processing device described above, the signal is an image signal, the storage section is provided for each color component of the image signal, and the updating of the storage section by the updating section is performed for each color component of the image signal.

In an embodiment of the invention, in the signal processing device described above, the signal is an image signal to be coded, the storage section is provided for each coding type for the image signal, and the updating of the storage section by the updating section is performed for each coding type for the image signal.

In an embodiment of the invention, in the signal processing device described above, the signal is an image signal to be coded and decoded, the storage section is provided for each mode, coding or decoding, for the image signal, and the updating of the storage section by the updating section is performed for each mode, coding or decoding, for the image signal.

The video system of the present invention includes: an image processing section including the signal processing device described above for performing image processing; a sensor for outputting an image signal to the signal processing device of the image processing section; and an optical system for converging light on the sensor.

Alternatively, the video system of the present invention includes: an image processing section including the signal processing device described above for performing image processing; and an A/D converter section for receiving an image signal of an analog value, converting the analog image signal to a digital value and outputting the digital value to the signal processing device of the image processing section.

Thus, according to the present invention, processing equivalent to inverse orthogonal transform can be done for a predetermined combination of orthogonal transform coefficients by sequentially outputting signal values obtained previously by inverse orthogonal transform, without the necessity of executing multiply and accumulate operation involving a large amount of processing. This reduces the number of times of execution of inverse orthogonal transform involving a large amount of processing, and thus enables speedup of decoding of an image signal and local decoding in inter-frame prediction coding.

In particular, in an embodiment of the present invention, a plurality of combinations of orthogonal transform coefficients that give the same signal value are grouped, and such a signal value is stored for each group. This can reduce the capacity of the storage section for storing signal values.

In an embodiment of the present invention, the signal value stored in advance is not fixed but is variably changeable. This makes it possible to store a different signal value corresponding to a combination of orthogonal transform coefficients high in appearance depending on the feature of an image handled in coding and decoding, and this further reduces the number of times of execution of inverse orthogonal transform.

In an embodiment of the present invention, a storage of a different device is shared as the storage section for storing a signal value in advance, and this reduces the cost.

In addition, in an embodiment of the present invention, in the case that a signal value corresponding to a received combination of orthogonal transform coefficients is stored in advance in a storage of a different device, read of the signal value is requested only when the status flag from the control section does not indicate "busy". This minimizes the burden of the different device.

In an embodiment of the present invention, the dedicated storage section may be constructed of a storage capable of operating at high speed, and a signal value corresponding to a combination of orthogonal transform coefficients high in appearance may be stored in the dedicated storage section. Contrarily, a signal value corresponding to a combination of orthogonal transform coefficients that is not so high in appearance may be stored in the common storage section. This increases the number of times of execution of processing equivalent to inverse orthogonal transform using a signal value stored in the dedicated storage section, and thus enables high-speed coding or decoding. In addition, processing equivalent to inverse orthogonal transform using a signal value stored in the common storage section is also executed repeatedly, and this enables further high-speed coding or decoding.

In an embodiment of the present invention, a signal value corresponding to a combination of orthogonal coefficients high in appearance is stored in advance in the storage section for each color component of an image signal, for each coding type or for each mode. This enables effective reduction of the number of times of execution of inverse orthogonal transform by computation for each color component of an image signal, for each coding type or for each mode.

In an embodiment of the present invention, the storage section can be made available for other uses via the setting section if no high-speed coding or decoding is necessary. This enables optimization of a system including the signal processing device of this embodiment.

In an embodiment of the present invention, the clock signal is supplied either to the storage section and the signal output section or to the inverse orthogonal transform section whichever is under operation, and thus low power consumption is attained.

In an embodiment of the present invention, a combination of orthogonal transform coefficients higher in appearance is determined, and the signal value corresponding to the determined combination is stored adaptively in place of some other value. Hence, high-speed coding or decoding can be attained independent of the feature of an image signal.

In an embodiment of the present invention, the storage section is used in common for all color components of the image signal, for all coding types or for both coding and decoding modes. In the updating of the storage section, however, higher priority is given to one predetermined color component, coding type or mode than to the other color components, coding types or mode. Hence, higher priority can be given to luminance component blocks large in the absolute number in coding and decoding, to the coding type large in the absolute number, or to coding, for example, in the updating, and thus effective speedup of given coding and decoding can be attained.

In an embodiment of the present invention, the storage section is provided for each color component of an image signal, for each coding type or for each mode. The updating of the storage section is performed for each color component, for each coding type or for each mode. Hence, individual adaptive updating is attained in coding and decoding, and thus further effective speedup of coding and decoding is attained.

BRIEF DESCRIPTION OF THE DRAWINGS

FIGS. 3A to 3C are views showing three different combinations of orthogonal transform coefficients, and FIG. 3D is a view showing a combination of pixel signal values, which are all "0", obtained by subjecting these three combinations of orthogonal transform coefficients to inverse orthogonal transform. FIGS. 3E to 3G are views showing other three different combinations of orthogonal transform coefficients, and FIG. 3H is a view showing a combination of pixel signal values, which are all "1", obtained by subjecting these three combinations of orthogonal transform coefficients to inverse orthogonal transform. FIGS. 3I to 3K are views showing yet other three different combinations of orthogonal transform coefficients, and FIG. 3L is a view showing a combination of pixel signal values, which are all "2", obtained by subjecting these three combinations of orthogonal transform coefficients to inverse orthogonal transform.

DESCRIPTION OF THE PREFERRED EMBODIMENTS

Hereinafter, preferred embodiments of the present invention will be described with reference to the accompanying drawings.

Embodiment 1

Figure 1:
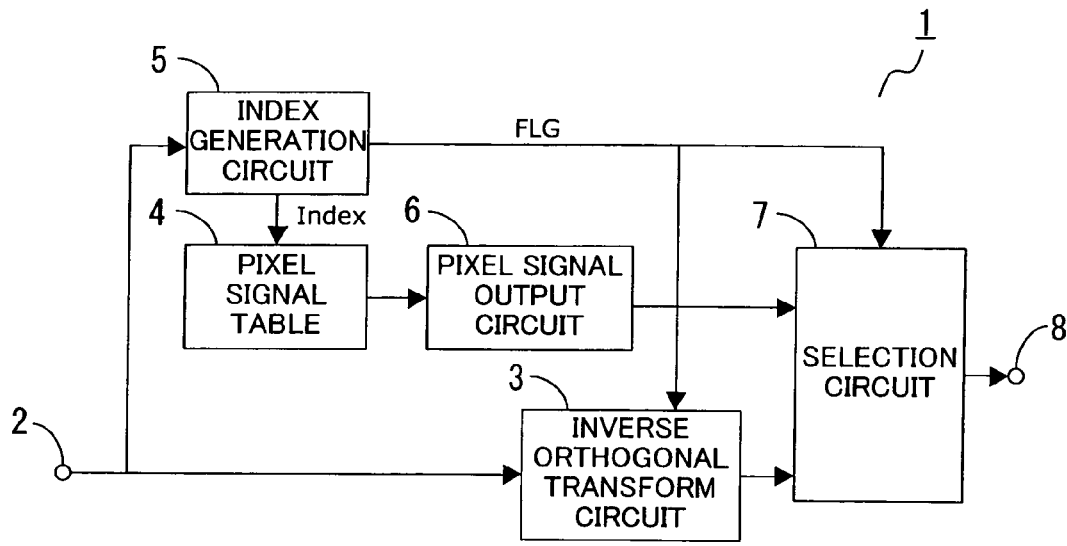
FIG. 1 is a block diagram of a signal processing device of Embodiment 1 of the present invention.
Figure 15:
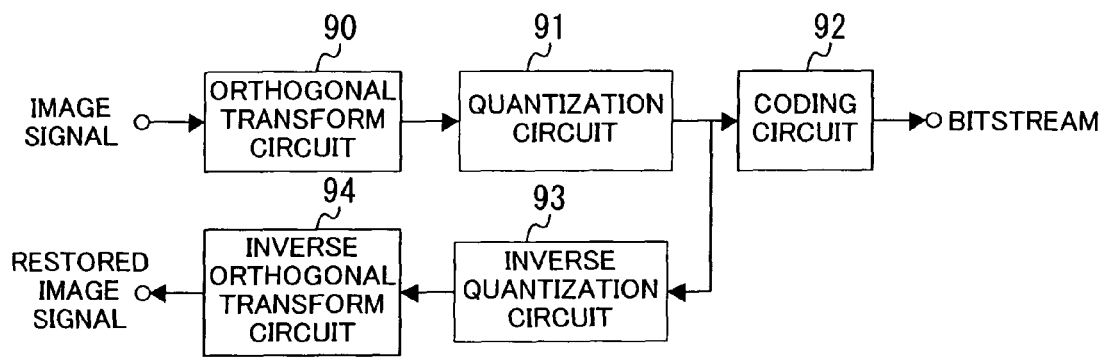
FIG. 15 is a block diagram of a conventional coding device.
Figure 16:
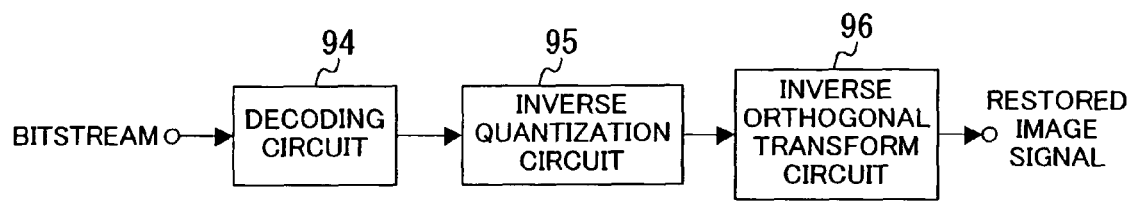
FIG. 16 is a block diagram of a conventional general decoding device.
Figure 17:
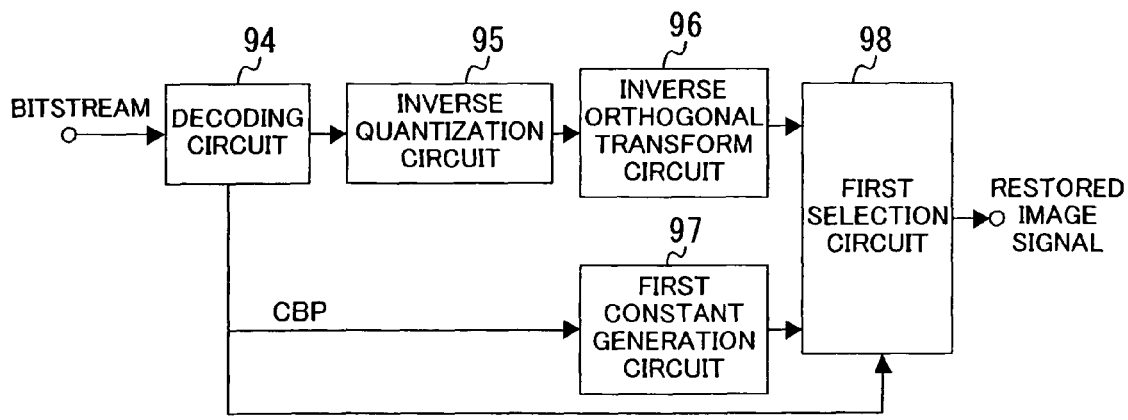
FIG. 17 is a block diagram of another conventional decoding device.

FIG. 1 is a block diagram of a signal processing device 1 of Embodiment 1 of the present invention. The signal processing device 1, intended for an image signal, for example, is a device for performing inverse orthogonal transform for orthogonal transform coefficients that are obtained by performing inverse quantization in a coding device or a decoding device as shown in FIG. 15 or 16.

Figures 4, 5, 6:
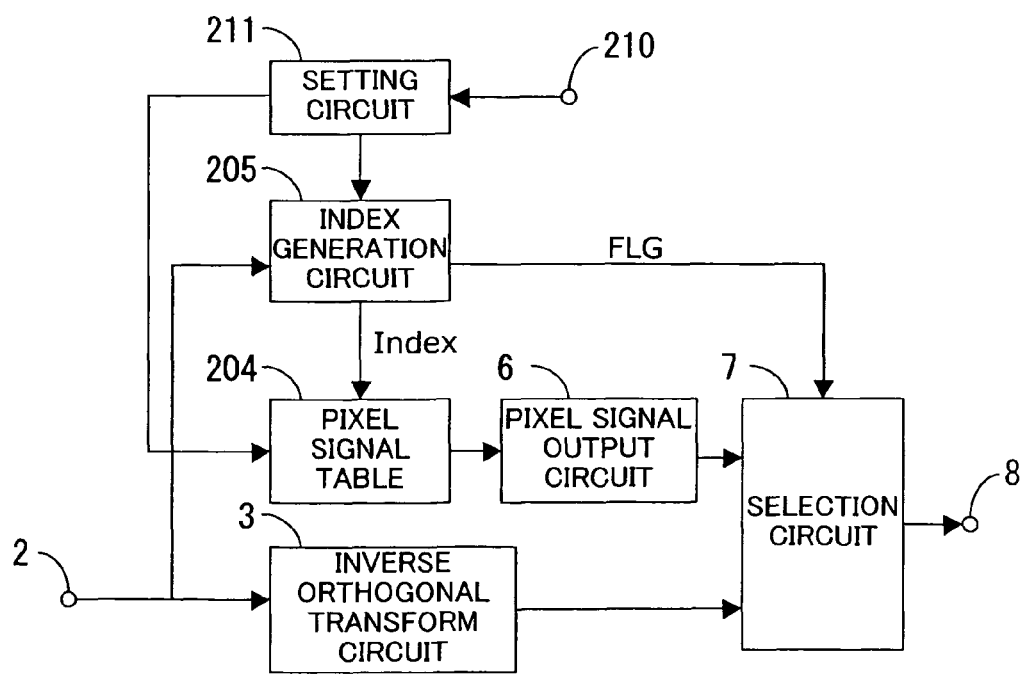
FIG. 4 is a view showing an example of assignment of indexes to groups of combinations of image signal coefficients.
FIG. 5 is a view showing an example of a pixel signal table.
FIG. 6 is a block diagram of a signal processing device of Embodiment 2 of the present invention.

Referring to FIG. 1, a pixel signal table (storage section) 4 stores therein three pixel signal values. "0", "1" and "2" corresponding to combinations of orthogonal transform coefficients high in appearance, for example, as shown in FIG. 5. Three indexes "0", "1" and "2" are allocated in advance to the pixel signal values "0", "1" and "2", respectively, to correspond to these pixel signal values.

An index generation circuit (index generation section and determination section) 5 receives a combination of orthogonal transform coefficients (inverse-quantized coefficients) input via an input terminal 2, and determines whether or not there is a pixel signal value corresponding to this combination of coefficients stored in the pixel signal table 4. If determining that the corresponding pixel signal value is stored, the index generation circuit 5 raises a flag FLG, and also generates an index Index corresponding to the stored pixel signal value and supplies the generated index Index to the pixel signal table 4. The pixel signal value corresponding to the supplied index Index is then read from the pixel signal table 4.

A pixel signal generation circuit (signal output section) 6 receives the pixel signal value read from the pixel signal table 4, and sequentially generates a combination of pixel signal values corresponding to the received combination of orthogonal transform coefficients based on the received pixel signal value. An inverse orthogonal transform circuit (inverse orthogonal transform section) 3 receives the combination of orthogonal transform coefficients input via the input terminal 2, and performs inverse orthogonal transform for the received combination of coefficients only when receiving a flag FLG from the index generation circuit 5.

A selection circuit (selection section) 7 makes selection based on the flag FLG received from the index generation circuit 5, that is, selects the output of the pixel signal generation circuit 6 if FLG=1 and selects the output of the inverse orthogonal transform circuit 3 if FLG=0, and outputs the selected one via an output terminal 8 as a restored signal. The pixel signal generation circuit 6, the inverse orthogonal transform circuit 3 and the selection circuit 7 together constitute a processing section for performing first inverse orthogonal transform using a pixel signal value stored in the pixel signal table 4 and second inverse orthogonal transform of performing inverse orthogonal transform for the received combination of orthogonal transform coefficients by computation and outputting either one of the processed results.

Figure 2:
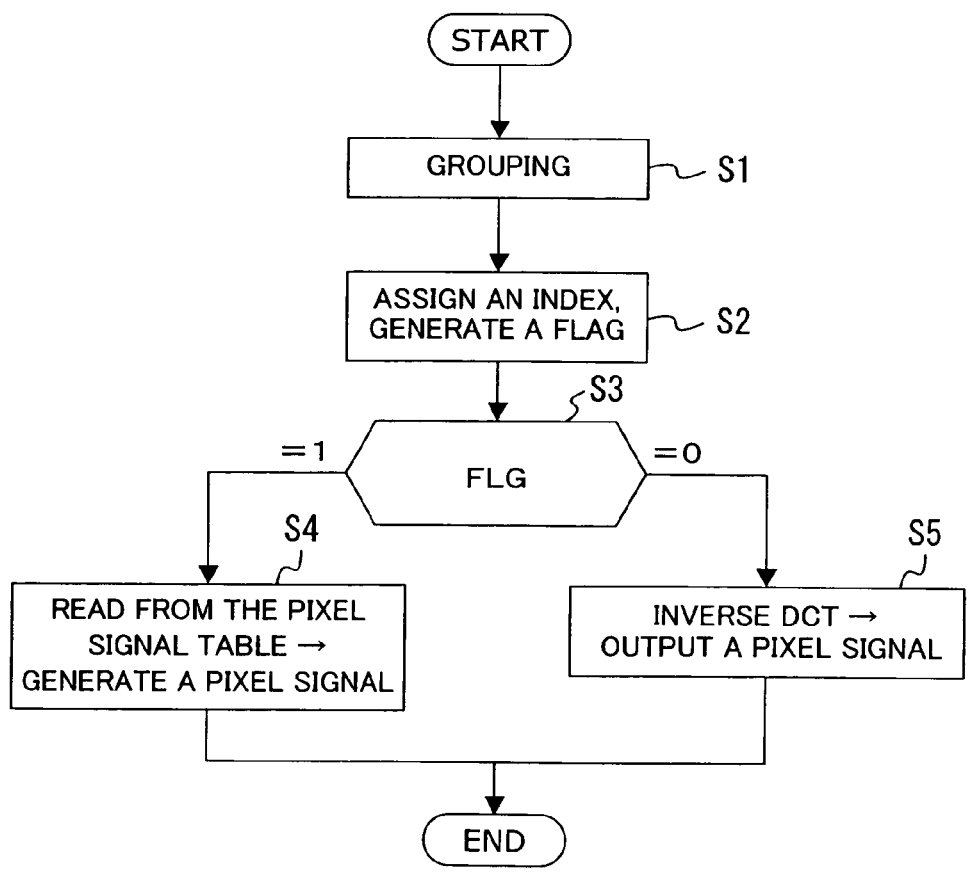
FIG. 2 is a flowchart of a signal processing method employed in the signal processing device of FIG. 1.

Hereinafter, a procedure for executing inverse orthogonal transform with the signal processing device 1 of FIG. 1 will be described in a concrete manner with reference to the flowchart of FIG. 2.

First, as described above, three pixel signal values "0", "1" and "2" are stored in advance in the pixel signal table 4, together with three indexes "0", "1" and "2" respectively corresponding to the three pixel signal values, as shown in FIG. 5 (storing step).

Figures 3A, 3B, 3C, 3D, 3E, 3F, 3G, 3H, 3I, 3J, 3K, 3L:
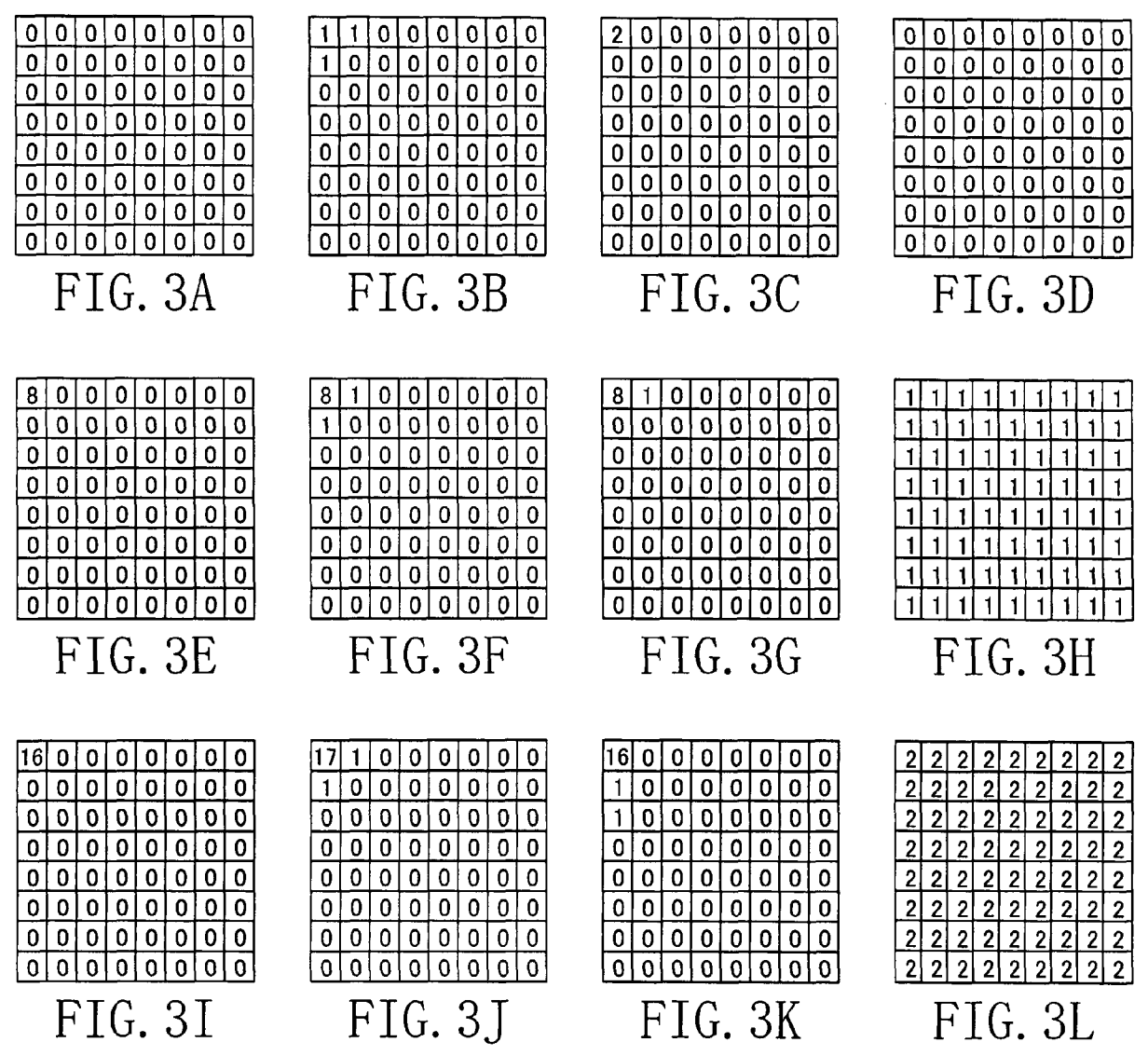

In actual execution of inverse orthogonal transform, orthogonal transform coefficients in blocks are sequentially input via the input terminal 2 and subjected to a series of steps S1 to S3 (determining step). Specifically, in the step S1, the index generation circuit 5 performs grouping (step of grouping). In the grouping, among a huge number of combinations of orthogonal transform coefficients (8×8 pieces) in blocks, combinations that are high in appearance and thus have a corresponding pixel signal value stored in advance in the pixel signal table 4 and that will have the same pattern of pixel signal values after the inverse orthogonal transform are put in the same group. For example, since multiply and accumulate operation including a decimal fraction is involved in the inverse orthogonal transform, all of the combinations of orthogonal transform coefficients shown in FIGS. 3A, 3B and 3C will result in the same pixel signal value "0" as shown in FIG. 3D after the inverse orthogonal transform, and thus these combinations are put in the same group. Likewise, all of the combinations of orthogonal transform coefficients shown in FIGS. 3E, 3F and 3G will result in the same pixel signal value "1" as shown in FIG. 3H after the inverse orthogonal transform, and thus these combinations are put in the same group. Also, all of the combinations of orthogonal transform coefficients shown in FIGS. 3I, 3J and 3K will result in the same pixel signal value "2" as shown in FIG. 3H after the inverse orthogonal transform, and thus these combinations are put in the same group. The grouping is not limited to the examples shown in FIGS. 3A to 3L, but there are a number of combinations of orthogonal transform coefficients that can be put in the same groups.

In the illustrated example, for simplification of description, a pixel signal pattern corresponding to a combination of orthogonal transform coefficients high in appearance can be represented by one pixel signal value "0", "1" or "2". If such a high-appearance combination is a combination of orthogonal transform coefficients including many high-frequency components, for example, the pixel signal pattern obtained after the inverse orthogonal transform will not be represented by one pixel signal value. In such a case, a plurality of pixel signal values may be stored in the pixel signal table 4.

In the step S2, an index (Index) is generated and allocated to specify the pixel signal value, among the pixel signal values stored in the pixel signal table 4, corresponding to a group to which a given combination of orthogonal transform coefficients belongs, as shown in FIG. 4. Also, the flag FLG indicating that the given combination of orthogonal transform coefficients is a combination stored in the pixel signal table 4 is generated (index generating step). Specifically, FLG=1 if stored, and otherwise FLG=0.

In the step S3, the status of FLG generated in the step S2 is determined. Specifically, if FLG=1, it is determined that there exists a pixel signal value corresponding to a given combination of orthogonal transform coefficients in the pixel signal table 4. If FLG=0, it is determined that there is no pixel signal value corresponding to a given combination of orthogonal transform coefficients in the pixel signal table 4.

According to the result of determination on the status of the flag FLG in the step S3, actual inversion orthogonal transform is performed in processing steps S4 and S5. Specifically, if FLG=1, in which there exists a pixel signal value corresponding to a given combination of orthogonal transform coefficients in the pixel signal table 4, the index generation circuit 5 supplies the generated index Index to the pixel signal table 4 and simultaneously supplies the flag FLG (FLG=1) to the selection circuit 7. The pixel signal generation circuit 6 reads the relevant pixel signal value from the pixel signal table 4 to generate a pixel signal for one block. The selection circuit 7 selects the pixel signal from the pixel signal generation circuit 6 based on the status of the flag FLG and outputs the selected signal to the output terminal 8 (step S4). At this time, the inverse orthogonal transform circuit 3 refrains from performing inverse orthogonal transform in response to the flag FLG (FLG=1) from the index generation circuit 5.

If FLG=0 in the step S3, in which there is no pixel signal value corresponding to a given combination of orthogonal transform coefficients in the pixel signal table 4, the index generation circuit 5 supplies the flag information (FLG=0) to the inverse orthogonal transform circuit 3 and the selection circuit 7. The inverse orthogonal transform circuit 3 executes inverse orthogonal transform for the received combination of orthogonal transform coefficients in a block by computation. The selection circuit 7 outputs a pixel signal received from the inverse orthogonal transform circuit 3 sequentially to the output terminal 8 based on the flag information (step S5).

By executing the processing in the steps S1 through S5 described above repeatedly for blocks of orthogonal transform coefficients, speedup-expected inverse orthogonal transform can be provided. That is, it is unnecessary to execute inverse orthogonal transform including multiply and accumulate operation involving a large amount of processing for combinations of orthogonal transform coefficients high in appearance, but processing equivalent to the inverse orthogonal transform can be attained only by accessing the pixel signal table 4. Accordingly, a significant speedup can be expected.

In the aforementioned prior art publication, speedup can be expected only for the combination of orthogonal transform coefficients that are all 0 (zero) in a block. In this embodiment, further speedup can be expected by merely storing in advance in the pixel signal table 4 one pixel signal value or pixel signal pattern corresponding to some combinations of orthogonal transform coefficients, among combinations of orthogonal transform coefficients high in appearance, not only the combination of orthogonal transform coefficients that are all 0 (zero). In particular, if setting is made so that storing in the pixel signal table 4 is allowed only when the pixel signal pattern corresponding to a combination of orthogonal transform coefficients high in appearance can be represented by one pixel signal value as in the case shown in FIG. 5 (when all of DC coefficients and AC coefficients are "0", "1" or "2", for example), the pixel signal table 4 can be constructed of a storage section comparatively small in capacity. In this case, therefore, the cost can be significantly reduced and also speedup can be expected.

Separate pixel signal tables 4 may be provided for luminance component blocks and color-difference component blocks, and the processing in the steps S1 through S5 may be executed repeatedly for blocks of orthogonal transform coefficients. In this case, further speedup can be expected. Likewise, separate pixel signal tables 4 may be provided for intra-blocks involving no inter-frame prediction coding and inter-blocks involving inter-frame prediction coding, and the processing in the steps S1 through S5 may be executed repeatedly for blocks of orthogonal transform coefficients. In this case, also, further speedup can be expected. Also, separate pixel signal tables 4 may be provided for coding and decoding, and the processing in the steps S1 through S5 may be executed repeatedly for blocks of orthogonal transform coefficients. In this case, speedup can be expected for both coding and decoding.

Embodiment 2

FIG. 6 shows a configuration of a signal processing device 201 of Embodiment 2 of the present invention. A feature of this embodiment largely different from Embodiment 1 is that a pixel signal table 204 is constructed of a storage section rewritable externally (SRAM, for example), to enable setting of one pixel signal value or pixel signal pattern corresponding to desired orthogonal transform coefficients in the pixel signal table 204 from an external setting terminal 210 via a setting circuit 211. In conjunction with the setting of the pixel signal table 204, it becomes necessary to change parameters required for the grouping and the generation of the index Index and the flag FLG in an index generation circuit 205. These changes are also made via the setting circuit 211.

In Embodiment 1 described above, pixel signal patterns corresponding to combinations of orthogonal transform coefficients high in appearance were stored in advance in the pixel signal table 4. The appearance of a combination of orthogonal transform coefficients however largely differs among types of images handled in coding and decoding. For example, a change in image signal in a block is large in the cases that an image signal including many noises is coded or decoded, that coding is made with a coding device low in motion detection precision, and that a bitstream produced with such a coding device is decoded, among others. Contrarily, a change in image signal in a block is small in the cases that an image signal including few noises and comparatively few high-frequency components is coded or decoded and that a bitstream decoded with a coding device significantly high in motion detection precision is decoded, among others. Therefore, in coding and decoding of an image in which a change in image signal is large and an image in which a change in image signal is small, the appearance of a combination of orthogonal transform coefficients greatly differs between these images.

Accordingly, if the pixel signal values stored in advance in the pixel signal table 4 are fixed, speedup may not be expected depending on the feature of an image handled. In this embodiment, however, the user can arbitrarily set the pixel signal table 204 externally, and thus speedup adaptive to the feature of an image can be expected.

As in Embodiment 1, separate pixel signal tables 204 may be provided for luminance components and color-difference components. Likewise, separate pixel signal tables 204 may be provided for intra-blocks involving no inter-frame prediction coding and inter-blocks involving inter-frame prediction coding. Also, separate pixel signal tables 204 may be provided for coding and decoding. Substantially the same effect as that in Embodiment 1 can also be obtained in these cases.

Embodiment 3

Figure 7:
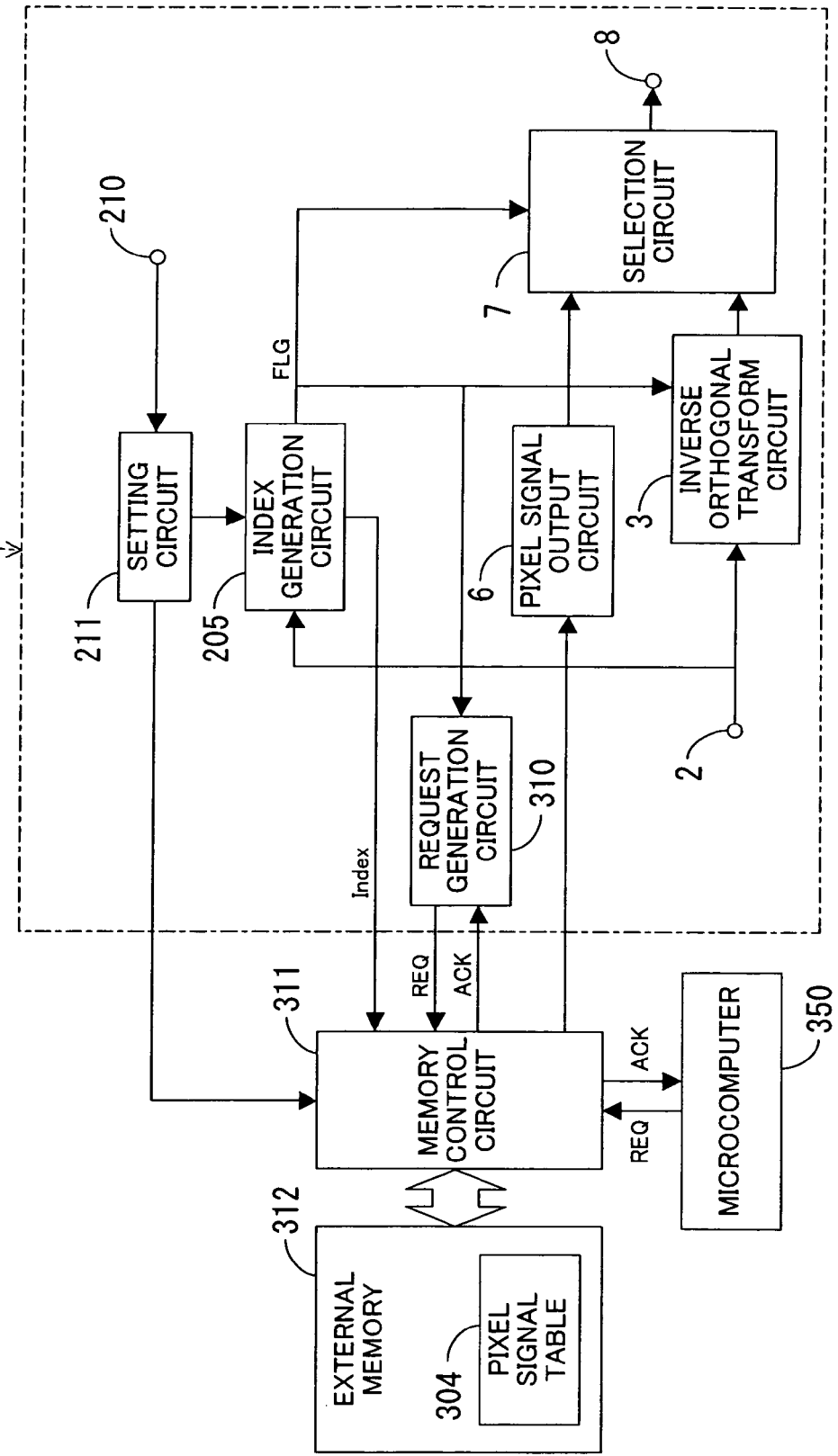
FIG. 7 is a block diagram of a signal processing device of Embodiment 3 of the present invention.

FIG. 7 shows a configuration of a signal processing device 301 of Embodiment 3 of the present invention. Referring to FIG. 7, the signal processing device 301 constitutes an image processing system as a whole together with a microcomputer 350, a memory control circuit (control section) 311 and an external memory (storage included in a different device) 312 having a comparative large capacity.

In the image processing system, when intending to read/write of data from/into the external memory 312, the microcomputer 350 issues a transfer request REQ to the memory control circuit 311. Once determining that the transfer is possible, the memory control circuit 311 returns a transfer acknowledgment ACK to the microcomputer 350, to enable read/write of the data.

A feature of this embodiment largely different from Embodiment 2 is that a portion of the external memory 312 provided in the image processing system is allocated as a pixel signal table 304.

The allocation for the pixel signal table 304 is done via the setting circuit 211 as in Embodiment 2. Read of a pixel signal value from the pixel signal table 304 is made in the following manner. A request generation circuit (request generation section) 310 issues a transfer request REQ to the memory control circuit 311 in the image processing system based on the information of the flag FLG received from the index generation circuit 205. In response to this request, the memory control circuit 311 makes an adjustment among this and other transfer requests and, once determining that the transfer is possible, returns a request acknowledgment ACK to the request generation circuit 310, to enable read of the pixel signal value in the pixel signal table 304.

In the configuration described above, no dedicated pixel signal table is necessary separately for speedup of inverse orthogonal transform, but a portion of the external memory 312 having a comparatively large capacity shared in the system may only be allocated for this table. Hence, in the resultant signal processing device, lower cost is attained and also speedup can be expected.

In this embodiment, however, the following problems may occur. The use of the external memory 312 shared in the system will result in placing a burden on the system. Also, access conflicts with other requests may occur when the traffic of memory buses is great, for example. In such a case, speedup may not be expected. The processing speed may rather be higher when inverse orthogonal transform is executed under multiply and accumulate operation.

As in Embodiment 1, separate pixel signal tables 304 may be provided for luminance components and color-difference components. Likewise, separate pixel signal tables 304 may be provided for intra-blocks involving no inter-frame prediction coding and inter-blocks involving inter-frame prediction coding. Also, separate pixel signal tables 304 may be provided for coding and decoding. Substantially the same effect as that in Embodiment 1 can also be obtained.

Embodiment 4

Figure 8:
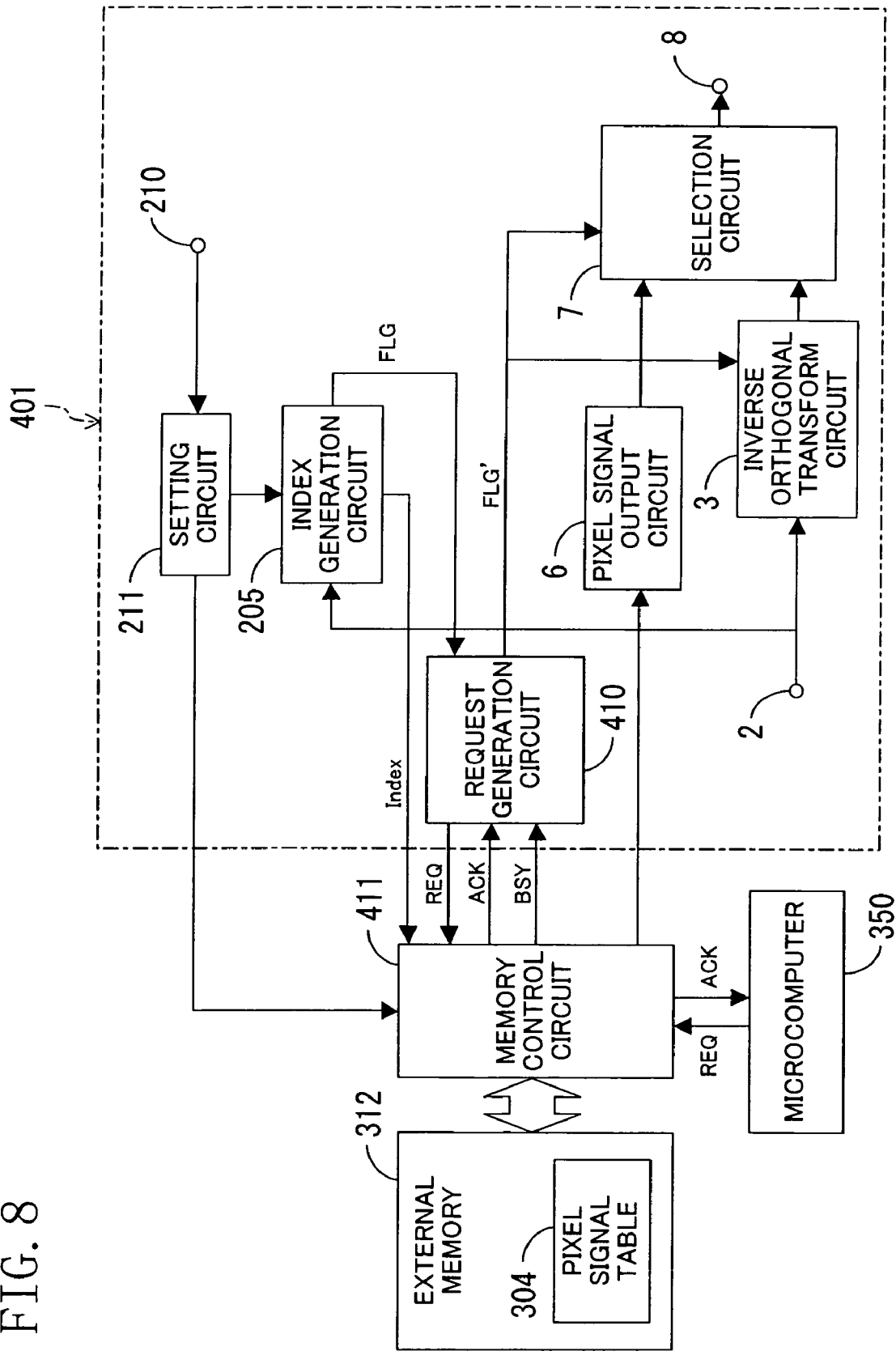
FIG. 8 is a block diagram of a signal processing device of Embodiment 4 of the present invention.

FIG. 8 shows a configuration of a signal processing device 401 of Embodiment 4 of the present invention. This embodiment is a modification of Embodiment 3.

Specifically, in Embodiment 3 described above, in the event of an occurrence of a combination of orthogonal transform coefficients stored in advance in the pixel signal table 304, the index generation circuit 205 determines that the combination has occurred, and the request generation circuit 310 issues a transfer request to the memory control circuit 311 based on the flag information (FLG=1). If the traffic of memory buses is so great that the request is kept from being permitted for a comparatively long time, the process must wait for this permission during this time period.

In this embodiment, however, a memory control circuit 411 is configured to output a busy signal BSY indicating that the external memory 312 is busy. Hence, in issuing a transfer request REQ to the memory control circuit 411 based on the flag information (FLG=1), a request generation circuit 410 can determine in advance whether or not to issue the transfer request depending on the state of the busy signal BSY supplied from the memory control circuit 411. Specifically, if BSY=1, that is, if the traffic of memory buses is so great that the transfer request will not be permitted soon, the request generation circuit 410 does not issue the transfer request giving up execution of inverse orthogonal transform using the pixel signal table 304 in the external memory 312, but supplies a flag (FLG'=0) to the inverse orthogonal transform circuit 3 and the selection circuit 7 to switch the processing to the inverse orthogonal transform under multiply and accumulate operation. Thus, the inverse orthogonal transform under multiply and accumulate operation is performed, and the resultant image signal is output.

As described above, in this embodiment, even in the case of a combination of orthogonal transform coefficients high in appearance for which the pixel signal value is stored in advance in the pixel signal table 304, placing a wasteful burden on the system can be avoided beforehand if speedup is not expected.

As in Embodiment 1, separate pixel signal tables 304 may be provided for luminance components and color-difference components. Likewise, separate pixel signal tables 304 may be provided for intra-blocks involving no inter-frame prediction coding and inter-blocks involving inter-frame prediction coding. Also, separate pixel signal tables 304 may be provided for coding and decoding. Substantially the same effect as that in Embodiment 1 can also be obtained.

Embodiment 5

Figure 9:
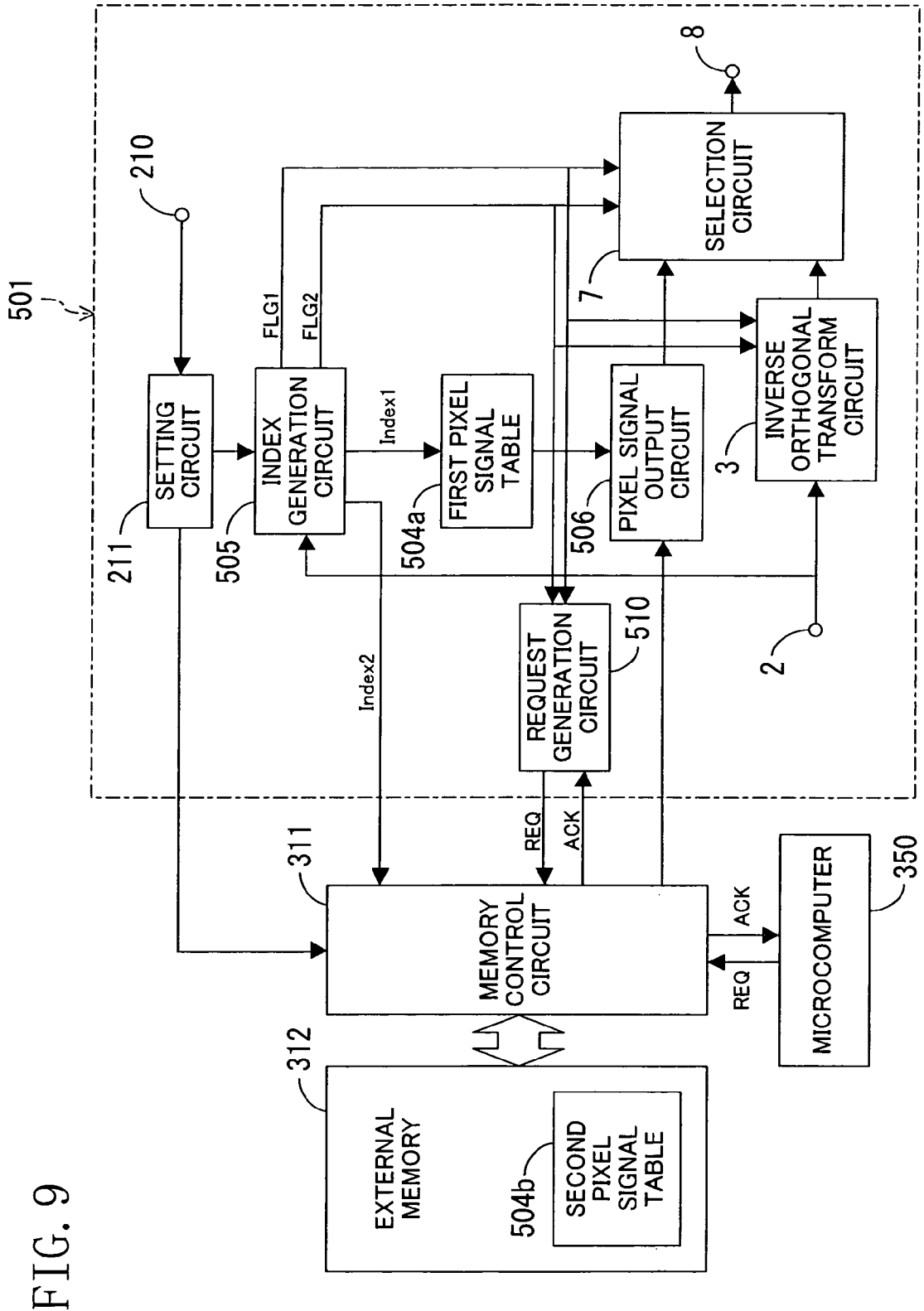
FIG. 9 is a block diagram of a signal processing device of Embodiment 5 of the present invention.

FIG. 9 shows a configuration of a signal processing device 501 of Embodiment 5 of the present invention. A feature of this embodiment is having two pixel signal tables: one being constructed of a dedicated storage section enabling high-speed accessing and the other being constructed of an allocated portion of a storage section shared in the system.

To state specifically, one pixel signal value or pixel signal pattern for a combination of orthogonal transform coefficients highest in appearance is stored in a first pixel signal table (dedicated storage section) 504a constructed of a dedicated storage section enabling high-speed accessing, while one pixel signal value or pixel signal pattern for a combination of orthogonal transform coefficients that is lower in appearance than the combination of orthogonal transform coefficients stored in the first pixel signal table 504a but with which speedup can be expected is stored in a second image signal table (shared storage section) 504b constructed of an allocated portion of the external memory 312 shared in the system.

In the event of an occurrence of a combination of orthogonal transform coefficients stored in the first pixel signal table 504a, an index generation circuit 505 supplies an index Index1 to the first pixel signal table 504a and also supplies a flag FLG1 (FLG1=1) to the inverse orthogonal transform circuit 3 and the selection circuit 7. A pixel signal generation circuit 506 generates pixel signal values for one block based on one pixel signal value or pixel signal pattern read from the first pixel signal table 504a, and outputs the generated pixel signal values to the selection circuit 7. The selection circuit 7 outputs the pixel signal received from the pixel signal generation circuit 506 as a restored pixel signal according to the status of the flag FLG1 (FLG1=1).

In the event of an occurrence of a combination of orthogonal transform coefficients stored in the second pixel signal table 504b in the external memory 312, the index generation circuit 505 supplies an index Index2 to the memory control circuit 311 and also supplies a flag FLG2 (FLG2=1) to a request generation circuit 510, the inverse orthogonal transform circuit 3 and the selection circuit 7. The request generation circuit 510 issues a transfer request to the memory control circuit 311. Once the transfer is permitted, the pixel signal generation circuit 506 generates pixel signal values for one block based on one pixel signal value or pixel signal pattern read from the second pixel signal table 504b, and outputs the generated pixel signal values to the selection circuit 7. The selection circuit 7 outputs the pixel signal received from the pixel signal generation circuit 506 as a restored pixel signal according to the status of the flag FLG2 (FLG2=1).

In the event of an occurrence of a combination of orthogonal transform coefficients that is not stored in either the first or second pixel signal table 504a or 504b, the index generation circuit 505 supplies the flags (FLG1=0 and FLG2=0) to the inverse orthogonal transform circuit 3 and the selection circuit 7. The inverse orthogonal transform circuit 3 performs inverse orthogonal transform under multiply and accumulate operation. The selection circuit 7 selects the output of the inverse orthogonal transform circuit 3 and outputs the selected signal as a restored image signal.

With the configuration described above, one pixel signal value or pixel signal pattern corresponding to each of combinations of orthogonal transform coefficients high in appearance is stored in not only the first pixel signal table 504a but also the second pixel signal table 504b, permitting storage of a larger number of values or patterns. This increases the probability of attaining speedup. In addition, since a pixel signal pattern corresponding to a combination of orthogonal transform coefficients with which speedup is most expected is read from the dedicated pixel signal table 504a permitting high-speed accessing, inverse orthogonal transform can be performed irrespective of the traffic of memory buses of the system. This ensures the minimum speedup capability, and furthermore further speedup can be expected depending on the state of the system.

As in Embodiment 1, for each of the pixel signal tables 504a and 504b, separate tables may be provided for luminance components and color-difference components. Likewise, separate pixel signal tables may be provided for intra-blocks involving no inter-frame prediction coding and inter-blocks involving inter-frame prediction coding. Also, separate pixel signal tables may be provided for coding and decoding. Substantially the same effect as that in Embodiment 1 can also be obtained.

Embodiment 6

Figure 10:
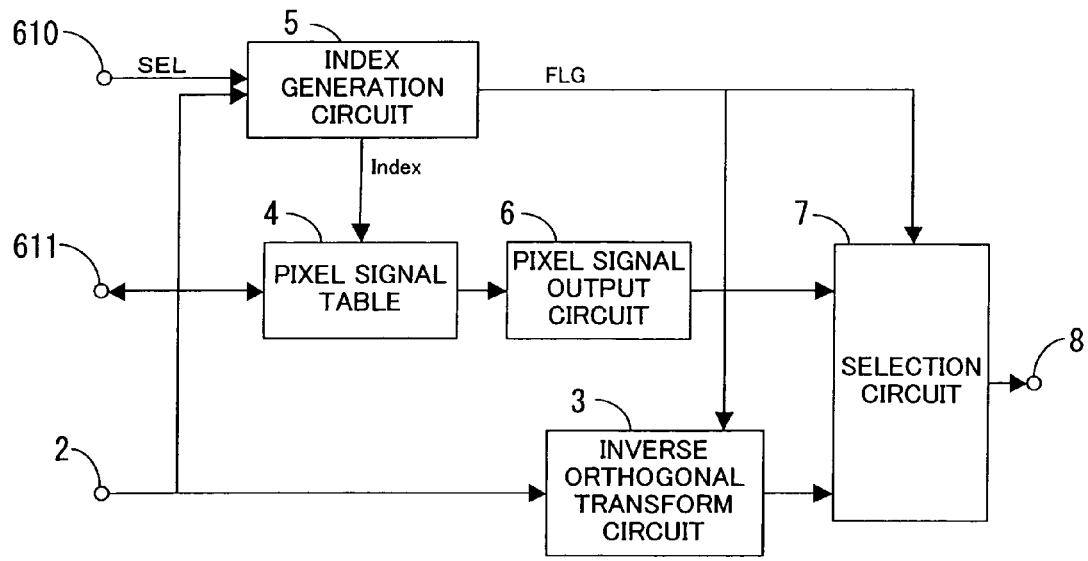
FIG. 10 is a block diagram of a signal processing device of Embodiment 6 of the present invention.

FIG. 10 shows a configuration of a signal processing device 601 of Embodiment 6 of the present invention. A feature of this embodiment is having an external setting terminal (setting section) 610 enabling setting of whether or not to adopt the inverse orthogonal transform using the pixel signal table 4.

In general, in coding and decoding of an image, the processing speed required varies with the size (width and height) of the image handled, the frame rate and the like. Specifically, speedup is often not required when a comparatively small image is coded or decoded and when an image low in frame rate is coded or decoded, for example. In such cases that do not require speedup, the pixel signal table 4 should desirably be made available for other uses.

In this embodiment, when no speedup is required for processing, a switch signal SEL=1 is supplied to the index generation circuit 5 via the external setting terminal 610. In response to the switch signal SEL=1, the index generation circuit 5 sets the flag FLG at "0" forcefully and outputs FLG=0 even if there exists a pixel signal value corresponding to the received combination of orthogonal transform coefficients in the pixel signal table 4, to thereby release the pixel signal table 4 for other uses. The other configuration of the signal processing device of this embodiment is substantially the same as that in Embodiment 1, and thus detailed description thereof is omitted here.

Thus, in this embodiment, in which the pixel signal table 4 is used only when speedup of processing is required and otherwise made available for other uses, optimization in the system level can be expected.

Embodiment 7

Figure 11:
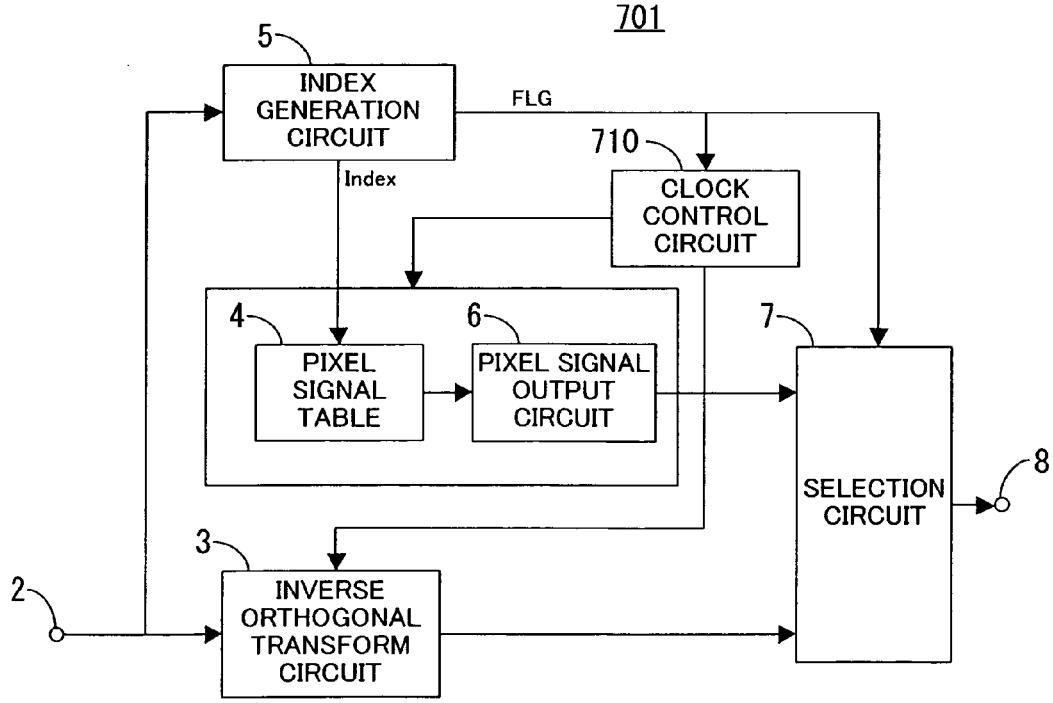
FIG. 11 is a block diagram of a signal processing device of Embodiment 7 of the present invention.

FIG. 11 shows a configuration of a signal processing device 701 of Embodiment 7 of the present invention. A feature of this embodiment is that a clock control circuit (clock signal control section) 710 is provided for controlling a clock signal supplied to the pixel signal table 4, the pixel signal generation circuit 6 and the inverse orthogonal transform circuit 3 based on information of the flag FLG output from the index generation circuit 5.

Specifically, if one pixel signal value or pixel signal pattern corresponding to a combination of orthogonal transform coefficients input every block is stored in advance in the pixel signal table 4, the index generation circuit 5 must operate the pixel signal table 4 and the pixel signal generation circuit 6 to perform processing equivalent to inverse orthogonal transform, but does not have to operate the inverse orthogonal transform circuit 3. Contrarily, if one pixel signal value or pixel signal pattern corresponding to a combination of orthogonal transform coefficients input every block is not stored in advance in the pixel signal table 4, the index generation circuit 5 must operate the inverse orthogonal transform circuit 3 to perform inverse orthogonal transform, but does not have to operate the pixel signal table 4 or the pixel signal generation circuit 6. That is to say, set of the pixel signal table 4 and the pixel signal generation circuit 6 and the inverse orthogonal transform circuit 3 may just operate mutually exclusively. In view of this, the clock control circuit 710 supplies the clock signal based on the flag FLG received from the index generation circuit 5: that is, supplies the clock signal only to the pixel signal table 4 and the pixel signal generation circuit 6 if FLG=1 and only to the inverse orthogonal transform circuit 3 if FLG=0.

Thus, in this embodiment, in which the clock signal is supplied only to a circuit that is currently in its operation period, efficient speedup can be expected without wasteful power consumption.

Embodiment 8

Figure 12:
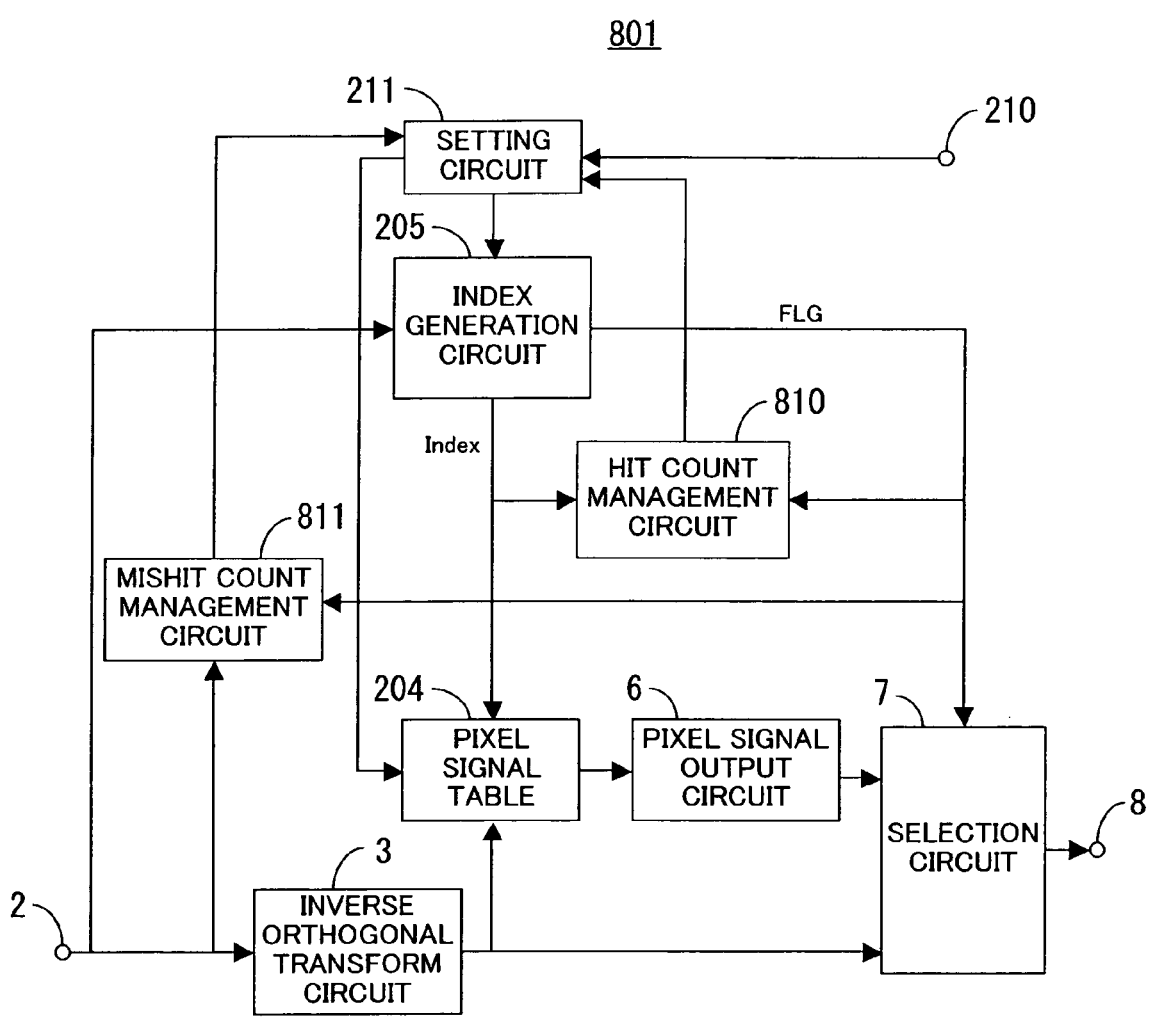
FIG. 12 is a block diagram of a signal processing device of Embodiment 8 of the present invention.

FIG. 12 shows a configuration of a signal processing device 801 of Embodiment 8 of the present invention. A feature of this embodiment greatly different from Embodiment 1 is that a hit count management circuit (hit count management section) 810 and a mishit count management circuit (appearance management section) 811 are newly provided.

The hit count management circuit 810 counts the number of times of hit of each index if the flag FLG output from the index generation circuit 205 is "1" and manages the counted value. The mishit count management circuit 811 holds a limited number of combinations of orthogonal transform coefficients, among combinations of orthogonal transform coefficients input via the input terminal 2, which are comparatively high in appearance statistically but are not stored in advance in the pixel signal table 204 due to lack of space in the pixel signal table 204, and also holds temporarily the appearance count of each of such combinations of coefficients, if the flag FLG output from the index generation circuit 205 is "0".

Figure 13:
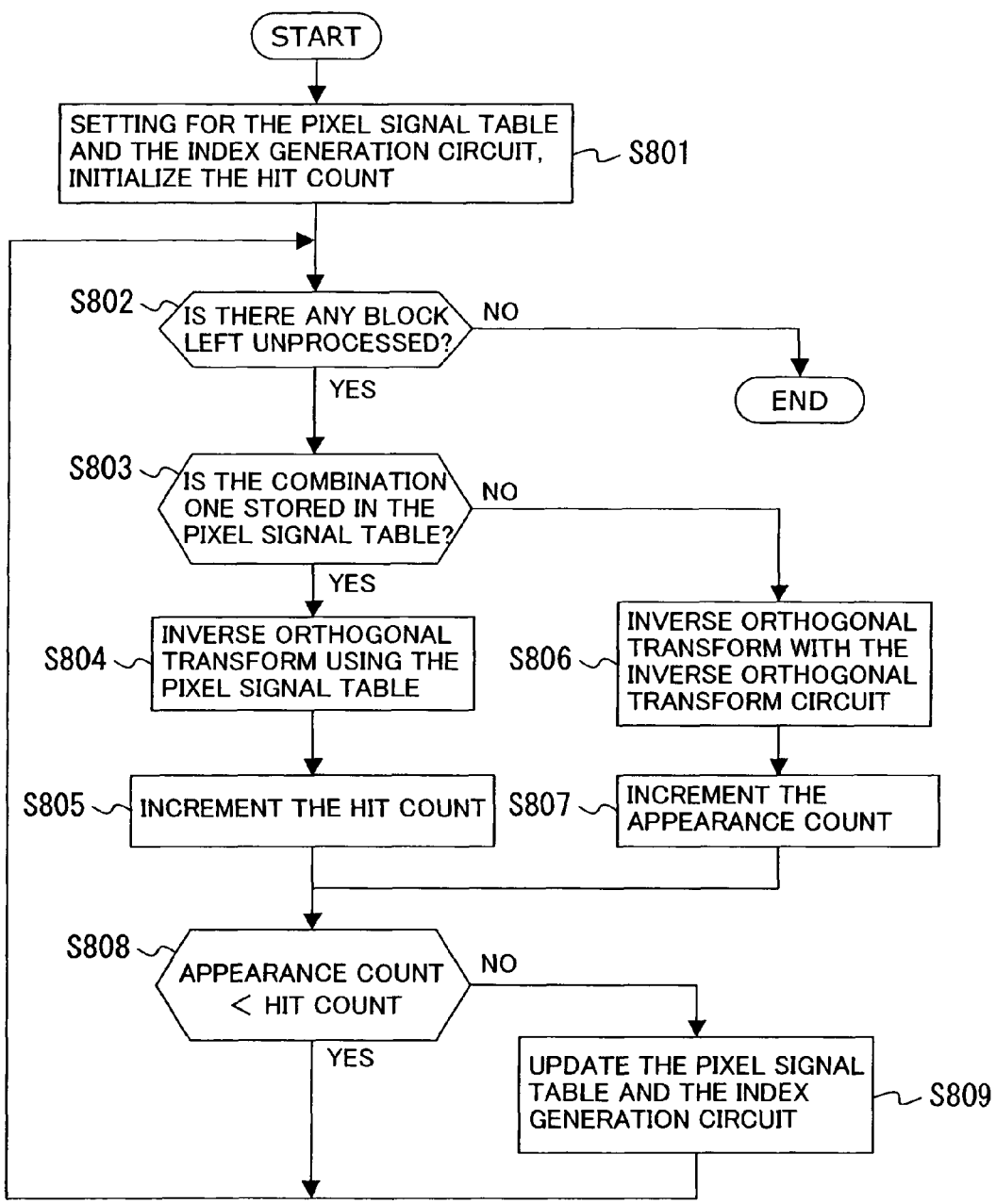
FIG. 13 is a flowchart of a signal processing method employed in the signal processing device of FIG. 12.

Hereinafter, the operation of the signal processing device of this embodiment will be described in detail with reference to the flowchart of FIG. 13.

First, one pixel signal value or pixel signal pattern and the index Index corresponding to a combination of orthogonal transform coefficients to be stored are set for the pixel signal table 204 and the index generation circuit 205 from the setting terminal 210 via the setting circuit 211. Also, the hit count of each value of the index Index in the hit count management circuit 810 is initialized (step S801). The initialization of the hit count refers to setting the hit count of each value of the index Index at a predetermined value other than 0 (zero) that is the minimum appearance count required for the stored pixel signal value or pixel signal pattern to be kept unrewritten in the pixel signal table 204.

Next, whether or not there is left a block yet to be processed is determined (step S802). If it is determined that there is left no block to be processed (No), the processing is terminated. If it is determined that there is left a block yet to be processed (Yes), the index generation circuit 205 determines whether or not a pixel signal value or pixel signal pattern corresponding to a received combination of orthogonal transform coefficients is already stored in the pixel signal table 204 (step S803).

If it is determined in the step S803 that the combination of orthogonal transform coefficients is one stored in the pixel signal table 204, processing equivalent to inverse orthogonal transform is performed using the pixel signal table 204 and the pixel signal generation circuit 6 (step S804). After the inverse orthogonal transform in the step S804, the hit count management circuit 810 increments the hit count of an index corresponding to the value of the index Index based on the flag FLG and the index Index supplied from the index generation circuit 205 (step S805). In other words every time an index corresponding to a value of the index Index appears, the hit count management circuit 810 updates the hit count of the index, and manages the hit count of each index.

If it is determined in the step S803 that the combination of orthogonal transform coefficients is not stored in the pixel signal table 204, inverse orthogonal transform by the inverse orthogonal transform circuit 3 is performed (S806). After the inverse orthogonal transform in the step S806, the mishit count management circuit 811 increments the appearance count of the received combination of orthogonal transform coefficients, and holds temporarily the combination of orthogonal transform coefficients and the appearance count of this combination (step S807). Although the number of combinations of orthogonal transform coefficients and the number of times of appearance of each combination acceptable by the mishit count management circuit 811 are not limited, limitation of these numbers may actually be made to some extent considering cost and other possible problems.

Subsequently, the setting circuit (comparison section) 211 compares the hit count of each index managed by the hit count management circuit 810 with the appearance count of each combination of orthogonal transform coefficients managed by the mishit count management circuit 811 (step S808). In the step S808, if the appearance count of any combination of orthogonal transform coefficients managed by the mishit count management circuit 811 is smaller than the hit count of any index (Yes), the processing returns to the step S802. Contrarily, if the appearance count is larger than the hit count of any index (No), it is determined that the combination of orthogonal transform coefficients input via the input terminal 2 is comparatively high in appearance statistically although not being stored in the pixel signal table 204. The setting circuit (updating section) 211 then updates the pixel signal table 204 by replacing the pixel signal value corresponding to the combination of orthogonal transform coefficients small in the hit count with the pixel signal value or pixel signal pattern corresponding to the combination of orthogonal transform coefficients large in the appearance count (step S809). Along with the updating of the pixel signal table 204, the group corresponding to the index in the index generation circuit 205 is also updated.

Thereafter, the operation of steps S802 through S809 is repeated until there is left no block to be processed.

Thus, in this embodiment, the pixel signal table 204 is updated adaptively so that a combination of orthogonal transform coefficients high in appearance can be stored in the pixel signal table 204 at any time even during execution of coding or decoding. Hence, speedup of inverse orthogonal transform independent of the type of the image handled can be expected.

If the capacity of the pixel signal table 204 is secured excessively over the space for the already-stored combinations of orthogonal transform coefficients, the pixel signal value for a combination of orthogonal transform coefficients high in appearance can be added to the pixel signal table 204 at any time. In this case, also, substantially the same effect as that described above can be obtained. However, since the pixel signal table 204 must be accessed at high speed, the cost-related problem will be greater with increase of the storage capacity. In view of this, as in this embodiment, the pixel signal table 204, for which high-speed operation is required (which has a cost impact), should preferably be constructed of a memory having a capacity as small as possible, and the contents of the pixel signal table 204 may be updated at any time by reading relevant information from the storage region in the mishit count management circuit 811, for which high-speed operation is not comparatively required, as required. By adopting this method, efficient speedup of processing will be attained without causing the problem described above.

Figure 18:
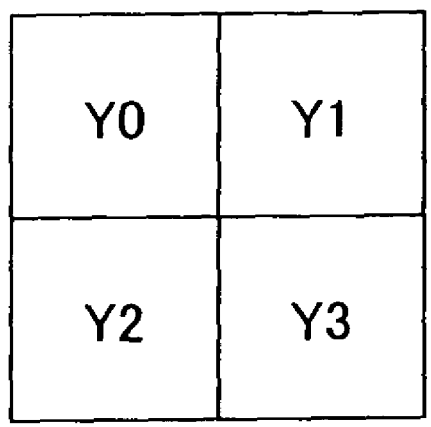
FIG. 18 is a view demonstrating a macro-block of an image signal.
Figure 18:
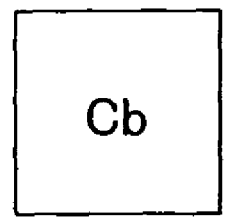
Figure 18:
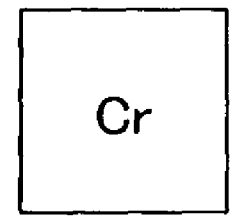
Figure 19:
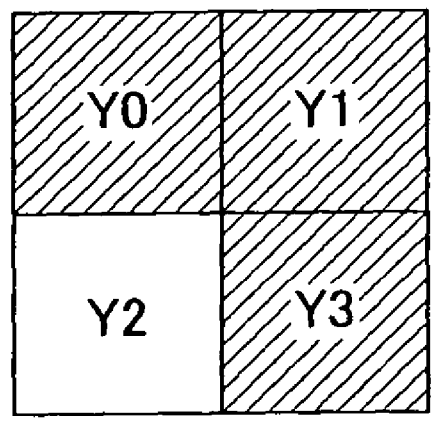
FIG. 19 is a view demonstrating a coded block pattern (CBP).
Figure 19:
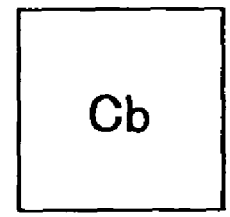
Figure 19:
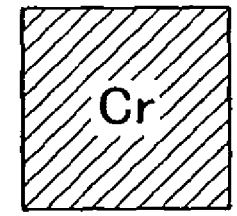

The updating control of the pixel signal table 204 (steps S808 and S809) may be done only for luminance component blocks or only for color-difference component blocks. By limiting the blocks for updating in this way, the possibility that updating in favor of one type of blocks may result in blocking speedup of processing for the other type of blocks can be prevented. In addition, higher priority may be given to speedup of processing for luminance components that are larger in the absolute number of blocks in each macro-block as the unit in coding or decoding (see FIG. 18).

Likewise, the updating control of the pixel signal table 204 (steps S808 and S809) may be done only for intra-coded blocks or only for inter-coded blocks. By limiting the blocks for updating in this way, the possibility that updating in favor of one type of blocks may result in blocking speedup of processing for the other type of blocks can be prevented. In addition, higher priority may be given to speedup of processing for the type of blocks larger in the absolute number in coding or decoding, so that speedup of processing as a whole can be expected.

Separate pixel signal tables 204 may be provided for luminance components and color-difference components, to enable separate updating control. With such separate updating, speedup can be expected for both luminance component blocks and color-difference blocks, and thus speedup of processing as a whole can further be expected. Likewise, separate pixel signal tables 204 may be provided for intra-blocks involving no inter-frame prediction coding and inter-blocks involving inter-frame prediction coding, to enable separate updating control. With such separate updating, speedup of processing can be expected for both intra-blocks and inter-blocks, and thus speedup of processing as a whole can further be expected. Also, separate pixel signal tables 204 may be provided for coding and decoding, to enable separate updating control as described above. In this case, speedup of processing can be expected for both coding and decoding.

In addition in the updating control described above, while the pixel signal table 204 being commonly used for all color components including the luminance components Y and the color-difference components Cr and Cb, higher priority may be given to the luminance components Y larger in the number of blocks. In this case, also, substantially the same effect as that described above can be obtained. This also applies to the cases of using the pixel signal table 204 in common for both the intra-coding and inter-coding types and for both the coding and decoding modes.

Embodiment 9

Figure 14:
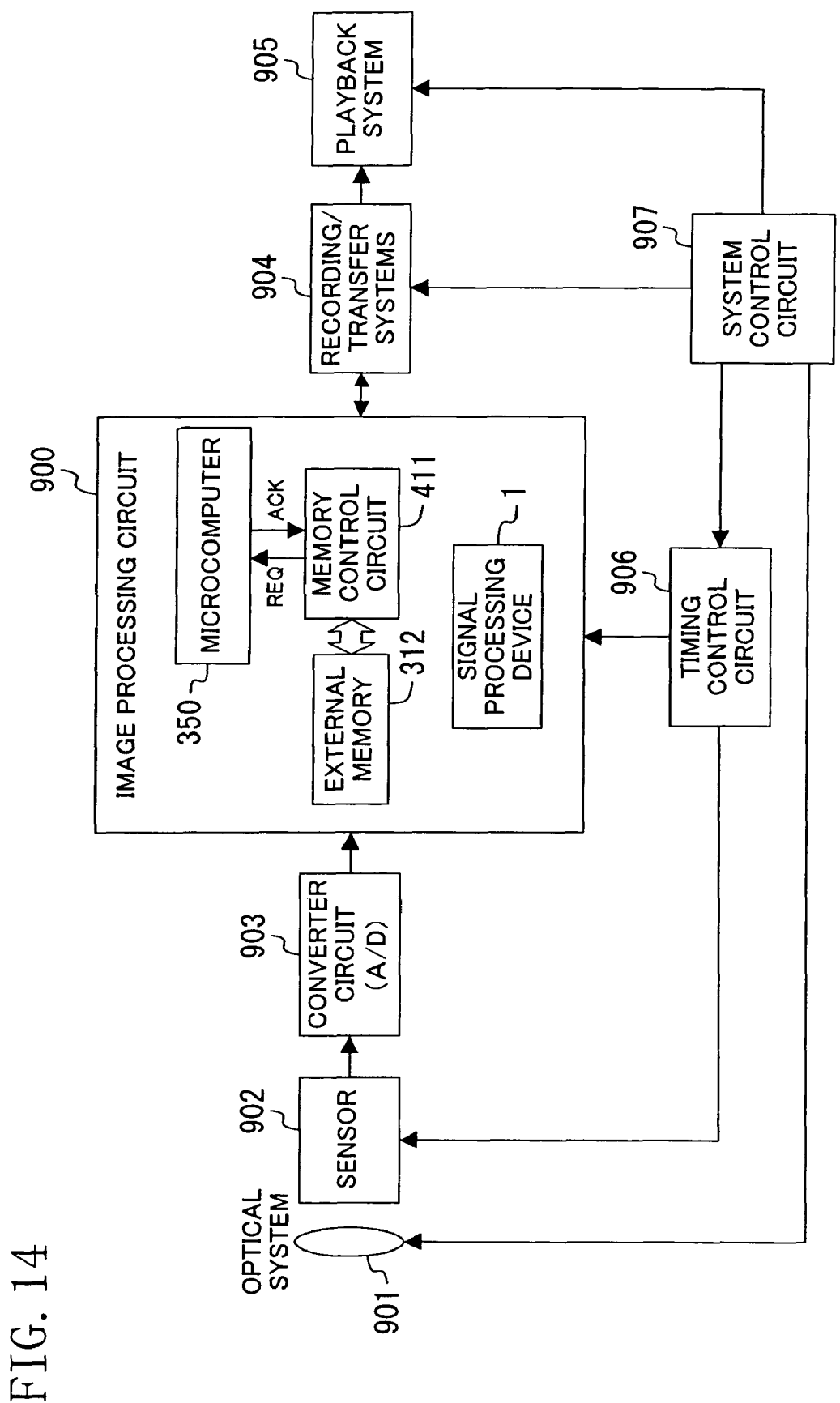
FIG. 14 is a block diagram of an imaging system of Embodiment 9 of the present invention.

Embodiment 9 of the present invention will be described with reference to FIG. 14. FIG. 14 shows an example of an imaging system (video system) such as a digital still camera, for example, using the signal processing device described above.

Referring to FIG. 14, image light incident via an optical system 901 is converged on a sensor 902 to be photoelectric-converted. An electric signal obtained by the photoelectric conversion is converted to a digital value by an A/D converter circuit 903 and then input into an image processing circuit 900 including the signal processing device 1 of FIG. 1, for example. In the image processing circuit 900, the input signal is subjected to Y/C processing, edge processing, scaling of images, and image compression/decompression such as JPEG and MPEG. The image-processed signal is then recorded in a medium or transferred by recording/transfer systems 904. The recorded/transferred signal is played back by a playback system 905. The sensor 902 and the image processing circuit 900 are controlled by a timing control circuit 906, while the optical system 901, the recording/transfer systems 904, the playback system 905 and the timing control circuit 906 are controlled by a system control circuit 907.

As the imaging system of FIG. 14, exemplified was camera equipment in which image light from the optical system 901 was photoelectric-converted by the sensor 902 and then input into the A/D converter circuit 903. The present invention is not limited to this, but it is needless to mention that an analog video input of AV equipment such as a TV set may be directly supplied to the A/D converter circuit 903.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A signal processing method for performing inverse orthogonal transform for a combination of orthogonal transform coefficients obtained by orthogonal-transforming a signal, the method comprising the steps of:

storing in advance a signal value obtained by performing inverse orthogonal transform for at least one-predetermined combination of orthogonal transform coefficients (storing step);

receiving combinations of orthogonal transform coefficients sequentially and determining whether or not each of the received combinations of orthogonal transform coefficients corresponds with the predetermined combination of orthogonal transform coefficients for which the signal value is stored in advance (determining step); and performing first inverse orthogonal transform in which a restored signal is output based on the signal value stored in advance if the received combination of orthogonal transform coefficients corresponds with the predetermined combination of orthogonal transform coefficients as a result of the determination, and performing second inverse orthogonal transform in which the received combination of orthogonal transform coefficients is subjected to inverse orthogonal transform by computation if the received combination of orthogonal transform coefficients does not correspond with the predetermined combination of orthogonal transform coefficients (processing step).

2. The method of claim 1, wherein the predetermined combination of orthogonal transform coefficients corresponding to the signal value stored in advance in the storing step is a combination of orthogonal transform coefficients high in appearance.

3. The method of claim 1, wherein in the storing step, a plurality of signal values are stored in advance,
   each of the plurality of signal values is a signal value corresponding to one group consisting of a plurality of combinations of orthogonal transform coefficients that will give the same signal value when being subjected to inverse orthogonal transform, and
   indexes corresponding to the plurality of signal values are assigned to the respective signal values.

4. The method of claim 3, wherein the determining step comprises the steps of:
   grouping received combinations of orthogonal transform coefficients (grouping step); and
   determining whether or not a group to which a received combination of orthogonal transform coefficients belongs is a group corresponding to any signal value stored in advance in the storing step, and if the received combination belongs to the corresponding group, generating a flag as well as generating an index for specifying the signal value for the corresponding group (index generating step), and
   in the processing step, the signal value corresponding to the index is read to output a restored signal if the flag is generated, and the received combination of orthogonal transform coefficients is subjected to inverse orthogonal transform by computation to output a restored signal if no flag is generated.

5. The step of claim 1, wherein the signal value stored in advance in the storing step is not fixed but variably changeable.

6. A signal processing device for performing inverse orthogonal transform for a combination of orthogonal transform coefficients obtained by orthogonal-transforming a signal, the device comprising:
   a storage section for storing in advance a signal value obtained by performing inverse orthogonal transform for at least one predetermined combination of orthogonal transform coefficients;
   a determination section for receiving combinations of orthogonal transform coefficients sequentially and determining whether or not each of the received combinations of orthogonal transform coefficients corresponds with the predetermined combination of orthogonal transform coefficients for which the signal value is stored in advance; and
   a processing section for performing first inverse orthogonal transform in which a restored signal is output based on the signal value stored in advance if the received combination of orthogonal transform coefficients corresponds with the predetermined combination of orthogonal transform coefficients as a result of the determination by the determination section, and performing second inverse orthogonal transform in which the received combination of orthogonal transform coefficients is subjected to inverse orthogonal transform by computation if the received combination of orthogonal transform coefficients does not correspond with the predetermined combination of orthogonal transform coefficients.

7. A signal processing device for performing inverse orthogonal transform for a predetermined combination of orthogonal transform coefficients obtained by orthogonal-transforming a signal, the device comprising:
   a storage section for storing in advance a signal value obtained by performing inverse orthogonal transform for at least one predetermined combination of orthogonal transform coefficients;
   an index generation section for grouping a plurality of received combinations of orthogonal transform coefficients, determining whether or not a signal value corresponding to each group is stored in advance in the storage section, and if the signal value is stored in the storage section, generating a flag as well as supplying an index for specifying the signal value for the corresponding group to the storage section to enable output of the signal value for the corresponding group from the storage section;
   a signal output section for receiving the signal value output from the storage section and sequentially outputting a plurality of signal values constituting a restored signal based on the signal value;
   an inverse orthogonal transform section for performing inverse orthogonal transform for the received combination of the orthogonal transform coefficients by computation; and
   a selection section for selecting the signal values from the signal output section if the index generation section generates a flag, and selecting the output from the inverse orthogonal transform section if no flag is generated,
   wherein inverse orthogonal transform for a received combination of orthogonal transform coefficients is switched between first inverse orthogonal transform of outputting a restored signal based on the signal value stored in advance and second inverse orthogonal transform performed by computation.

8. The device of claim 6 or 7, wherein the storage section is constructed of a storage permitting rewrite of a signal value.

9. The device of claim 7, wherein the storage section is constructed of a region of a storage included in a different device,
   the device further comprises a request generation section for generating a transfer request for a signal value and outputting the request to a control section for controlling write/read in/from the storage included in the different device when the index generation section generates a flag,
   the index generation section outputs the index to the storage included in the different device, and once a transfer acknowledgment for the signal value is obtained from the control section, the signal value is read from the storage included in the different device.

10. The device of claim 9, wherein the control section outputs a status flag indicating the status of the different device to the request generation section, and
the request generation section determines whether or not to issue a transfer request for a signal value to the control section based on the status flag from the control section.

11. The device of claim 7, wherein the storage section is used as a dedicated storage section, and the device further comprises a common storage section constructed of a region of a storage included in a different device separately from the dedicated storage section,
the index generation section determines in which storage section, the dedicated storage section or the common storage section, a signal value corresponding to a group to which the received combination of orthogonal transform coefficients belongs is stored, and outputs the index specifying the signal value for the corresponding group to the dedicated storage section or the common storage section when the signal value is stored in the dedicated storage section or the common storage section, to enable output of the signal value for the corresponding group from the dedicated storage section or the common storage section.

12. The device of claim 6 or 7, wherein the signal is an image signal,
the storage section is provided for each color component of the image signal, and
the switching between the first inverse orthogonal transform and the second inverse orthogonal transform is performed for each color component.

13. The device of claim 6 or 7, wherein the signal is an image signal to be coded,
the storage section is provided for each coding type for the image signal, and
the switching between the first inverse orthogonal transform and the second inverse orthogonal transform is performed for each coding type for the image signal.

14. The device of claim 6 or 7, wherein the signal is an image signal to be coded and decoded,
the storage section is provided for each mode, coding or decoding, for the image signal, and
the switching between the first inverse orthogonal transform and the second inverse orthogonal transform is performed for each mode, coding or decoding, for the image signal.

15. The device of claim 6 or 7, further comprising a setting section for setting whether to perform the first inverse orthogonal transform of outputting a restored signal based on a signal value stored in advance in the storage section, or to perform, not the first inverse orthogonal transform, but the second inverse orthogonal transform of performing inverse orthogonal transform for a received combination of orthogonal transform coefficients by computation although execution of the first inverse orthogonal transform is possible, by switching from outside.

16. The device of claim 7, further comprising a clock signal control section for supplying a clock signal to the storage section and the signal output section while stopping supply of the clock signal to the inverse orthogonal transform section if the index generation section generates a flag, and supplying the clock signal to the inverse orthogonal transform section while stopping the supply of the clock signal to the storage section and the signal output section if the index generation section generates no flag.

17. The device of claim 7, further comprising:
a hit count management section for receiving an index from the index generation section and counting the number of times of output of each index; and
an appearance count management section for storing in advance a predetermined combination of orthogonal transform coefficients other than any combination of orthogonal transform coefficients corresponding to any signal value stored in the storage section and counting the number of times of appearance of the predetermined combination of orthogonal transform coefficients.

18. The device of claim 17, further comprising:
a comparison section for comparing the output count of each index in the hit count management section with the appearance count of a predetermined combination of orthogonal transform coefficients stored in advance in the appearance count management section; and
an updating section for updating the storage section, in response to the result of the comparison by the comparison section, by storing in the storage section the predetermined combination of orthogonal transform coefficients stored in advance in the appearance count management section, in place of a combination of orthogonal transform coefficients corresponding to any index in the hit count management section, if the appearance count of the predetermined combination of orthogonal transform coefficients stored in the appearance count management section is larger than the output count of the index.

19. The device of claim 18, wherein the signal is an image signal,
the storage section is provided in common for a plurality of color components of the image signal, and
higher priority is given to one predetermined color component among the color components of the image signal in the updating of the storage section by the updating section.

20. The device of claim 18, wherein the signal is an image signal to be coded,
the storage section is provided in common for all coding types for the image signal, and
higher priority is given to one predetermined coding type than to any other coding type in the updating of the storage section by the updating section.

21. The device of claim 18, wherein the signal is an image signal to be coded and decoded,
the storage section is provided in common for both modes, coding and decoding, for the image signal, and
higher priority is given to one mode than to the other mode in the updating of the storage section by the updating section.

22. The device of claim 18, wherein the signal is an image signal,
the storage section is provided for each color component of the image signal, and
the updating of the storage section by the updating section is performed for each color component of the image signal.

23. The device of claim 18, wherein the signal is an image signal to be coded,
the storage section is provided for each coding type for the image signal, and
the updating of the storage section by the updating section is performed for each coding type for the image signal.

24. The device of claim 18, wherein the signal is an image signal to be coded and decoded, the storage section is provided for each mode, coding or decoding, for the image signal, and the updating of the storage section by the updating section is performed for each mode, coding or decoding, for the image signal.

25. A video system comprising:

an image processing section including the signal processing device of claim 6 or 7 for performing image processing;

a sensor for outputting an image signal to the signal processing device of the image processing section; and an optical system for converging light on the sensor.

26. A video system comprising:

an image processing section including the signal processing device of claim 6 or 7 for performing image processing; and an A/D converter section for receiving an image signal of an analog value, converting the analog image signal to a digital value and outputting the digital value to the signal processing device of the image processing section.

* * * * *